Figure 8:
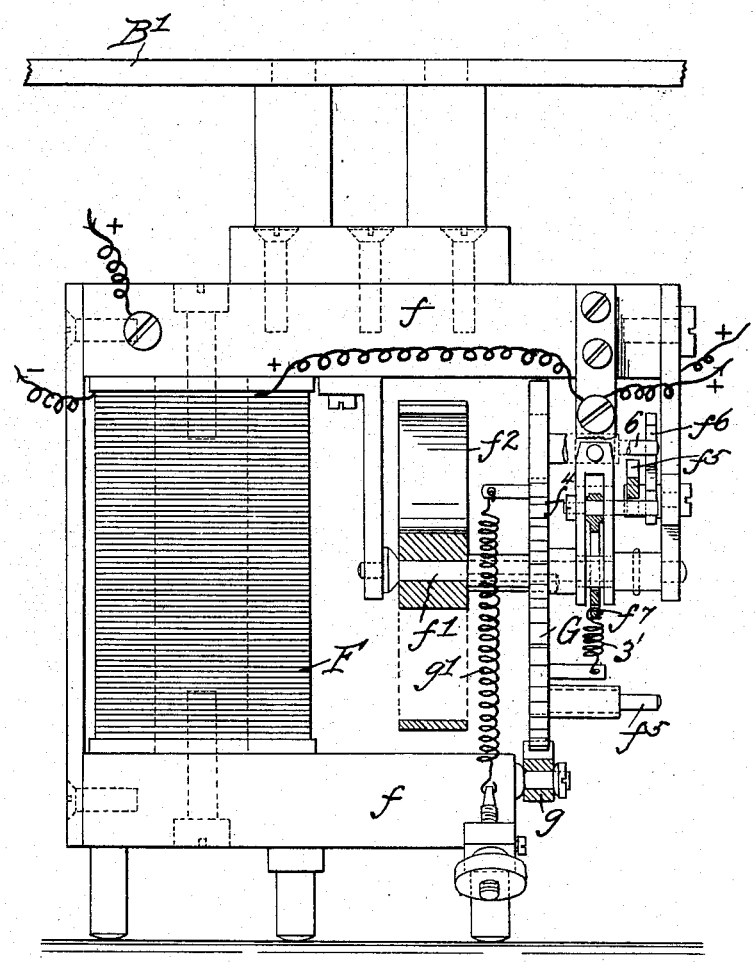

No. 673,480. Patented May 7, 1901.
L. SELLNER.
APPARATUS FOR SIGNALING BY NIGHT.
(Application filed Apr. 3, 1897.)
(No Model.) 18 Sheets—Sheet 1.
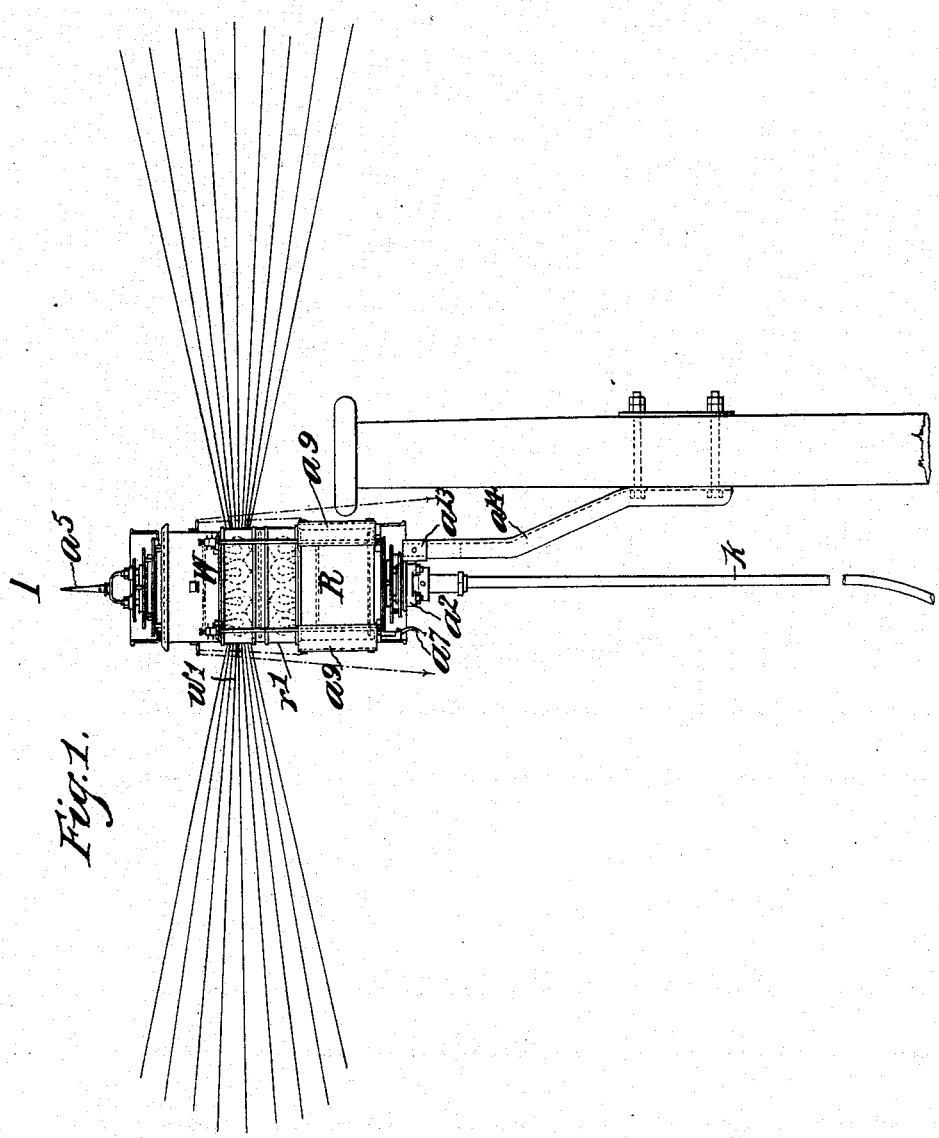

No. 673,480. Patented May 7, 1901.
L. SELLNER.
APPARATUS FOR SIGNALING BY NIGHT.
(Application filed Apr. 3, 1897.)
(No Model.) 18 Sheets—Sheet 2.
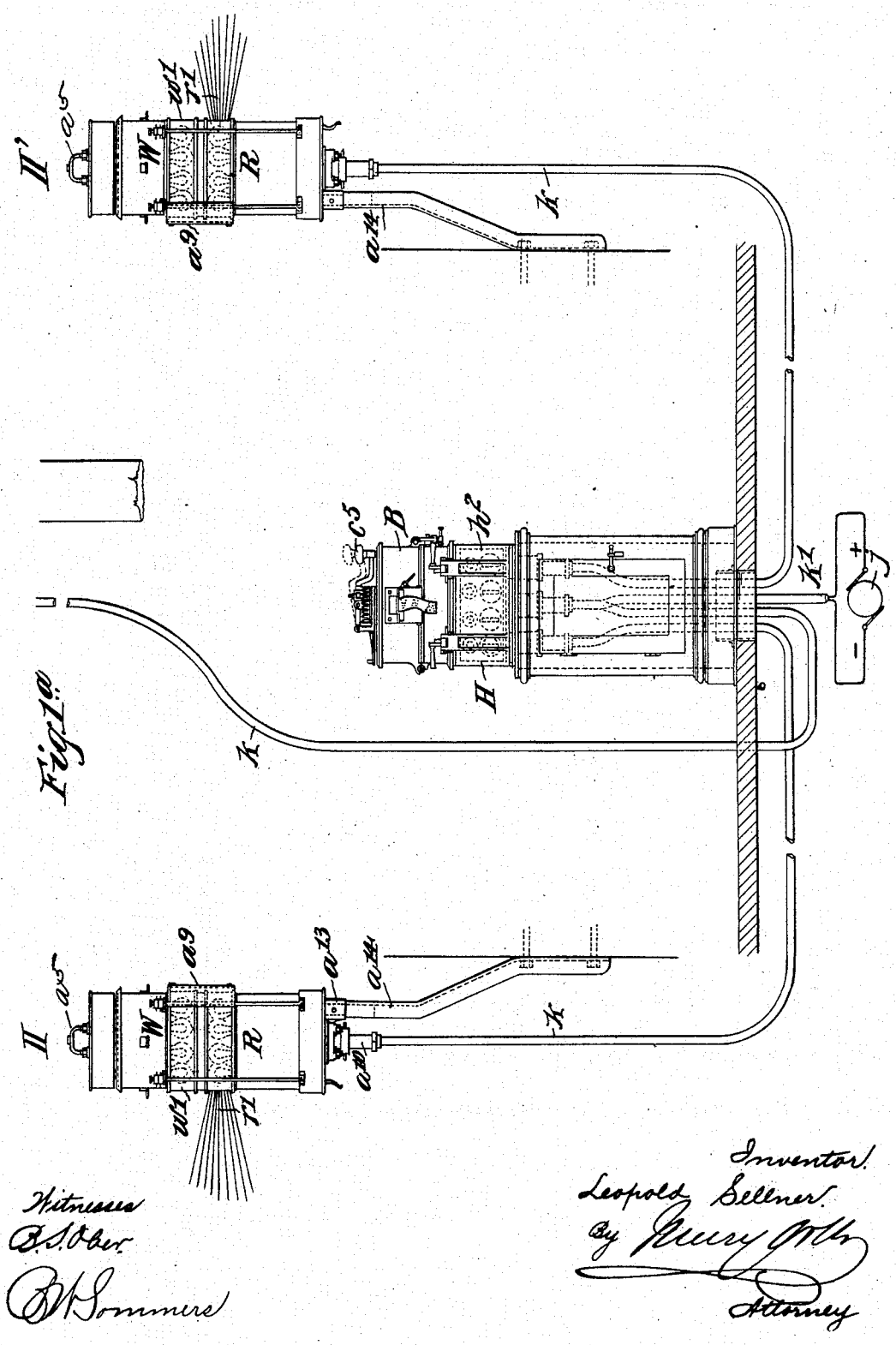

No. 673,480. Patented May 7, 1901.
L. SELLNER.
APPARATUS FOR SIGNALING BY NIGHT.
(Application filed Apr. 3, 1897.)
(No Model.) 18 Sheets—Sheet 3.
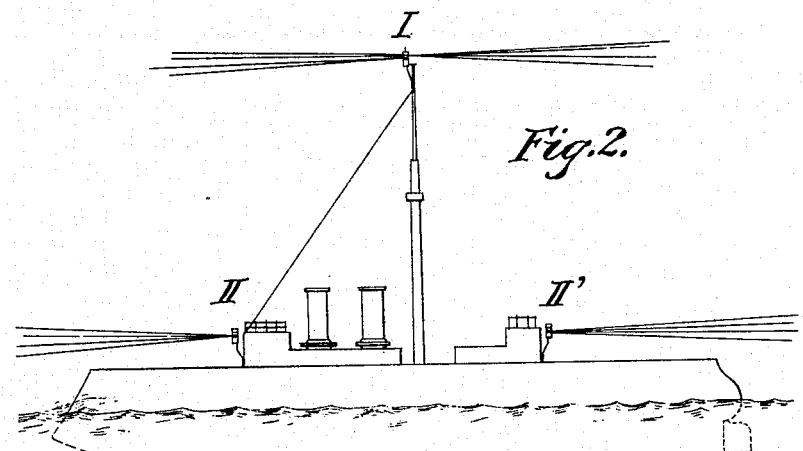
Fig. 2.
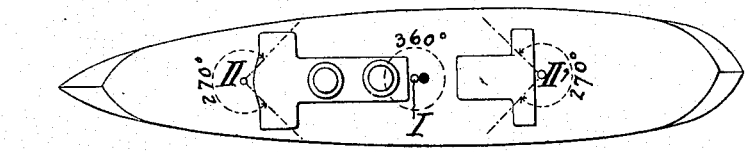
Fig. 2.ª
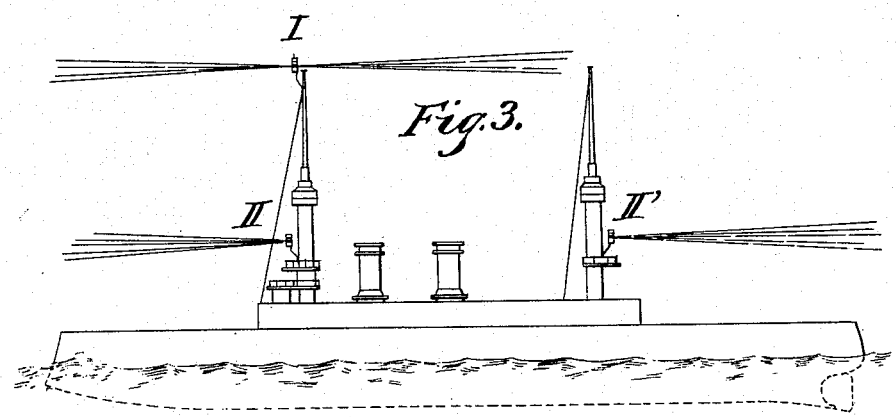
Fig. 3.
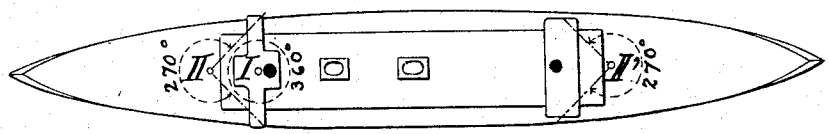
Fig. 3.ª
Witnesses:
O. S. Ober
B. H. Sommer
Inventor:
Leopold Sellner
By Henry Orth
Attorney
THE NORRIS PETERS CO., PHOTO-LITHO., WASHINGTON, D. C.

No. 673,480. Patented May 7, 1901.
L. SELLNER.
APPARATUS FOR SIGNALING BY NIGHT.
(Application filed Apr. 3, 1897.)
(No Model.) 18 Sheets—Sheet 4.
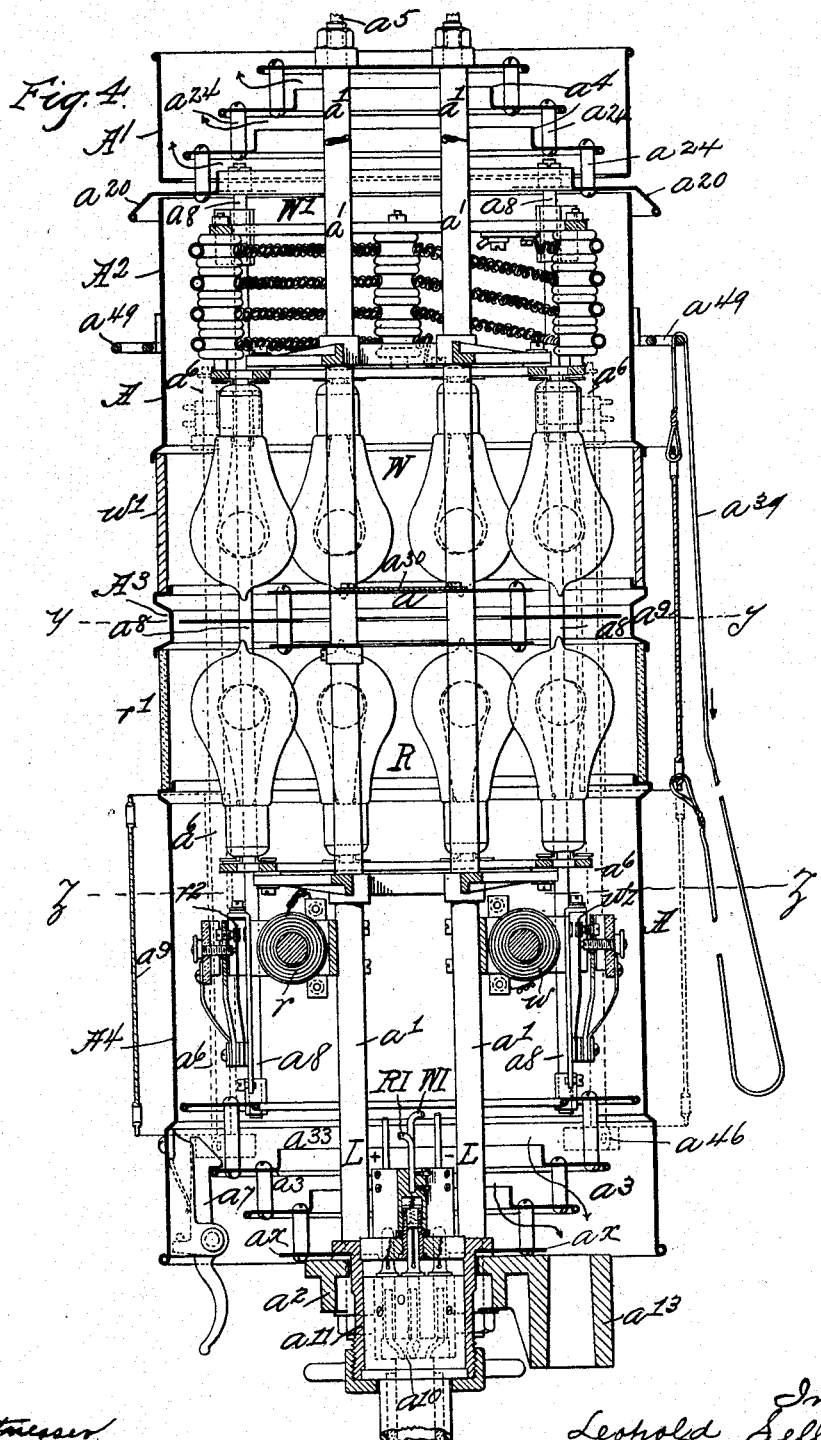

No. 673,480. Patented May 7, 1901.
L. SELLNER.
APPARATUS FOR SIGNALING BY NIGHT.
(Application filed Apr. 3, 1897.)
(No Model.) 18 Sheets—Sheet 5.
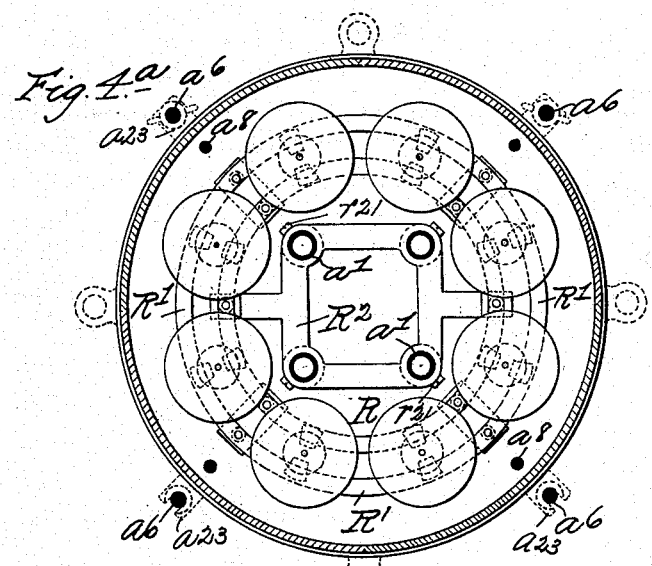
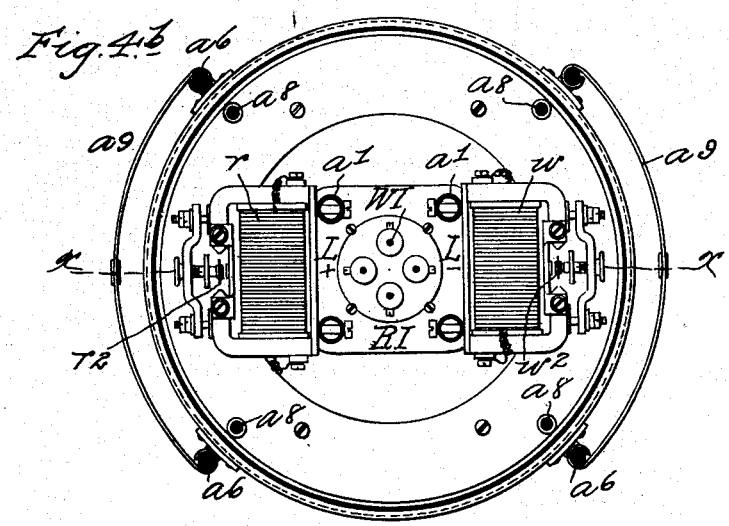
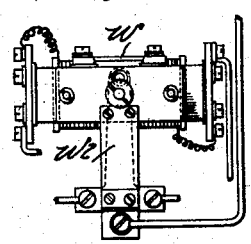
Witnesses
Inventor
Leopold Sellner
By Attorney No. 673,480. Patented May 7, 1901.
L. SELLNER.
APPARATUS FOR SIGNALING BY NIGHT.
(Application filed Apr. 3, 1897.)
(No Model.) 18 Sheets—Sheet 6.
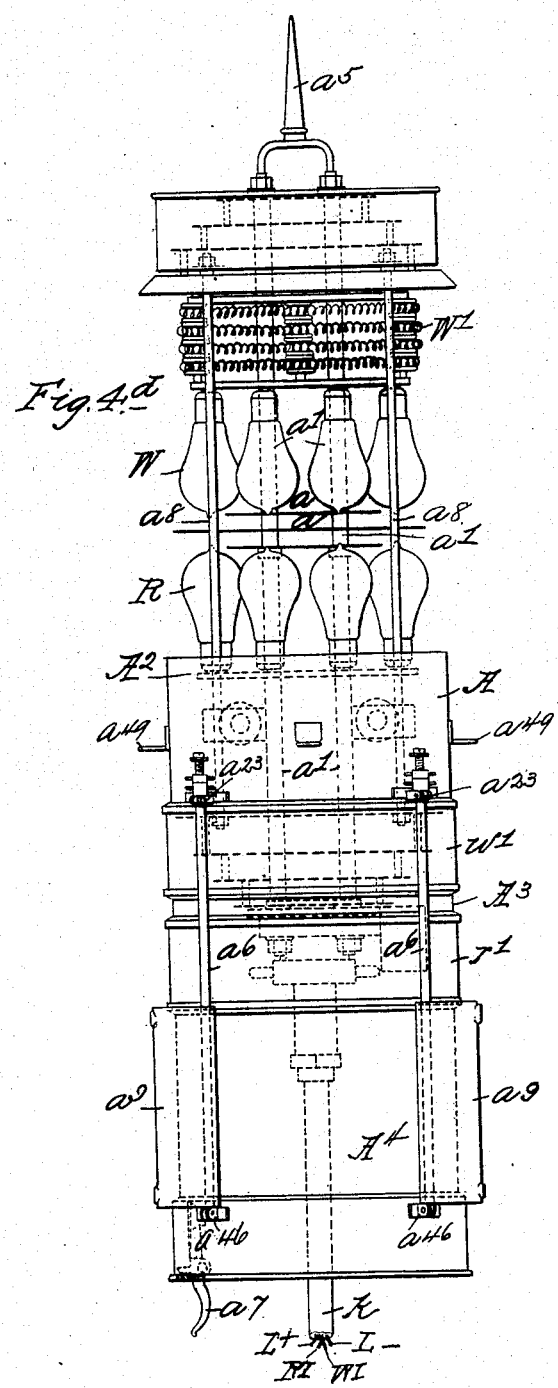

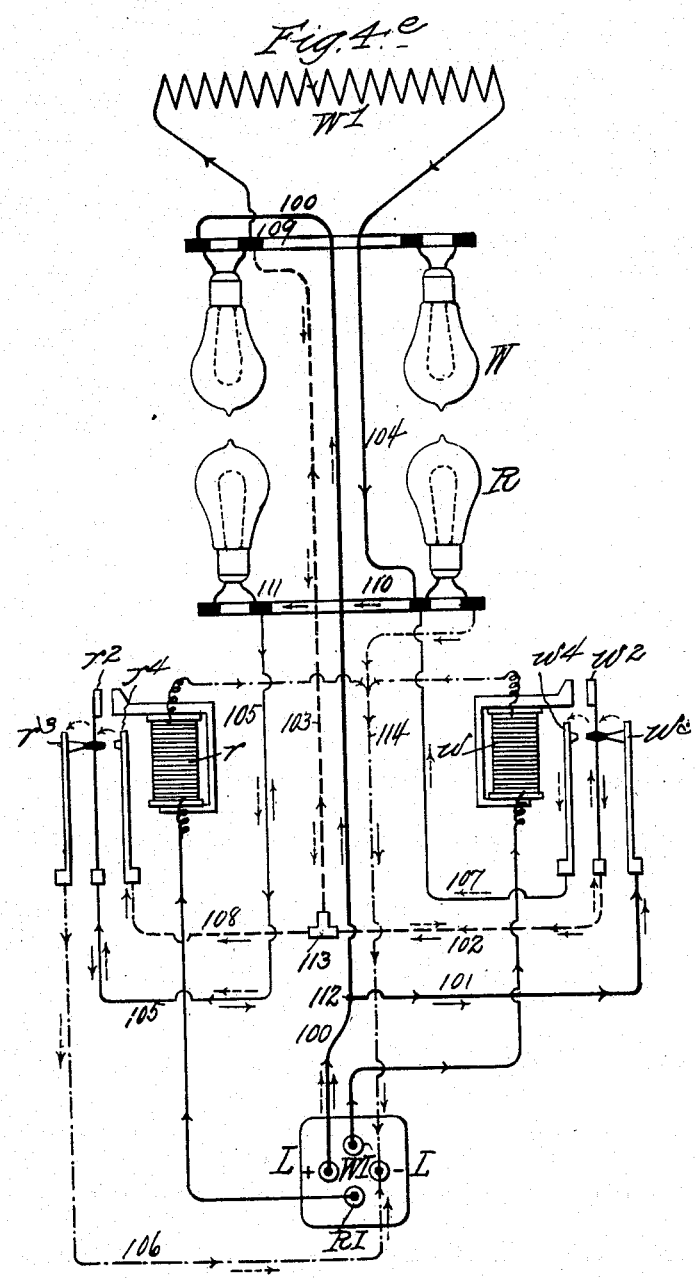

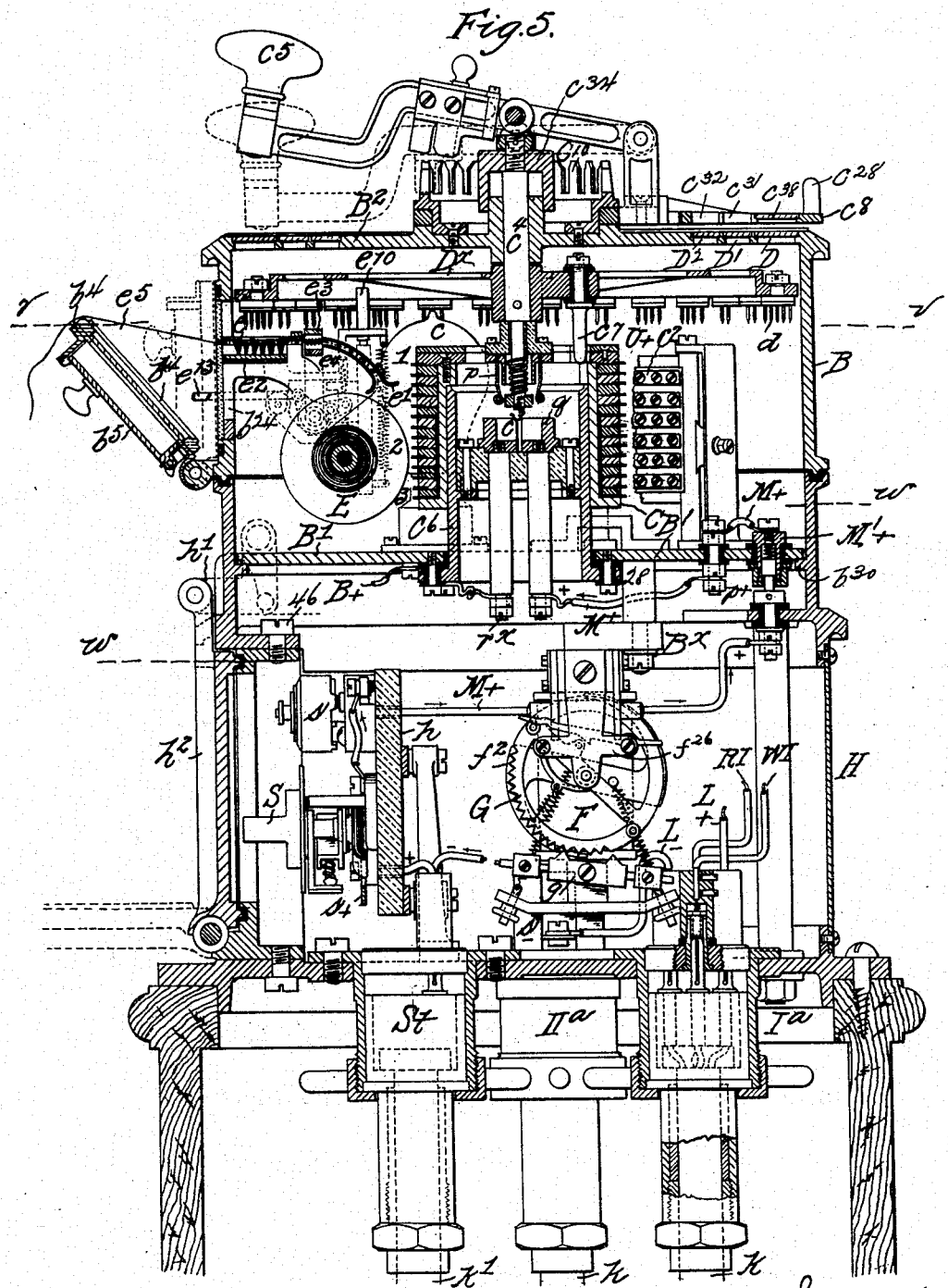

No. 673,480. Patented May 7, 1901.
L. SELLNER.
APPARATUS FOR SIGNALING BY NIGHT.
(Application filed Apr. 3, 1897.)
(No Model.) 18 Sheets—Sheet 9.
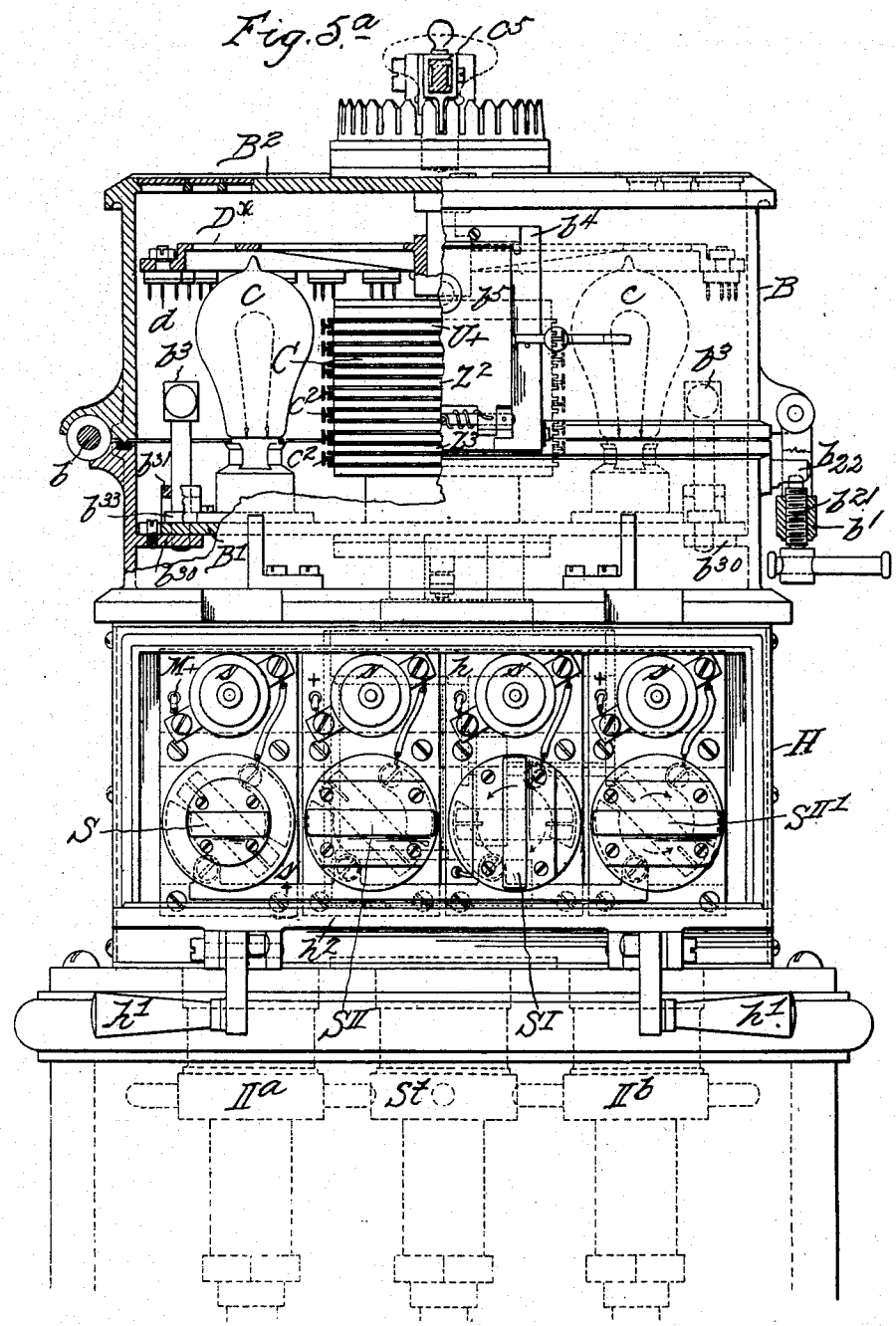

No. 673,480.  
L. SELLNER.  
APPARATUS FOR SIGNALING BY NIGHT.  
(Application filed Apr. 3, 1897.)  
Patented May 7, 1901.
(No Model.)  
18 Sheets—Sheet 10.
Fig. 5ᵇ
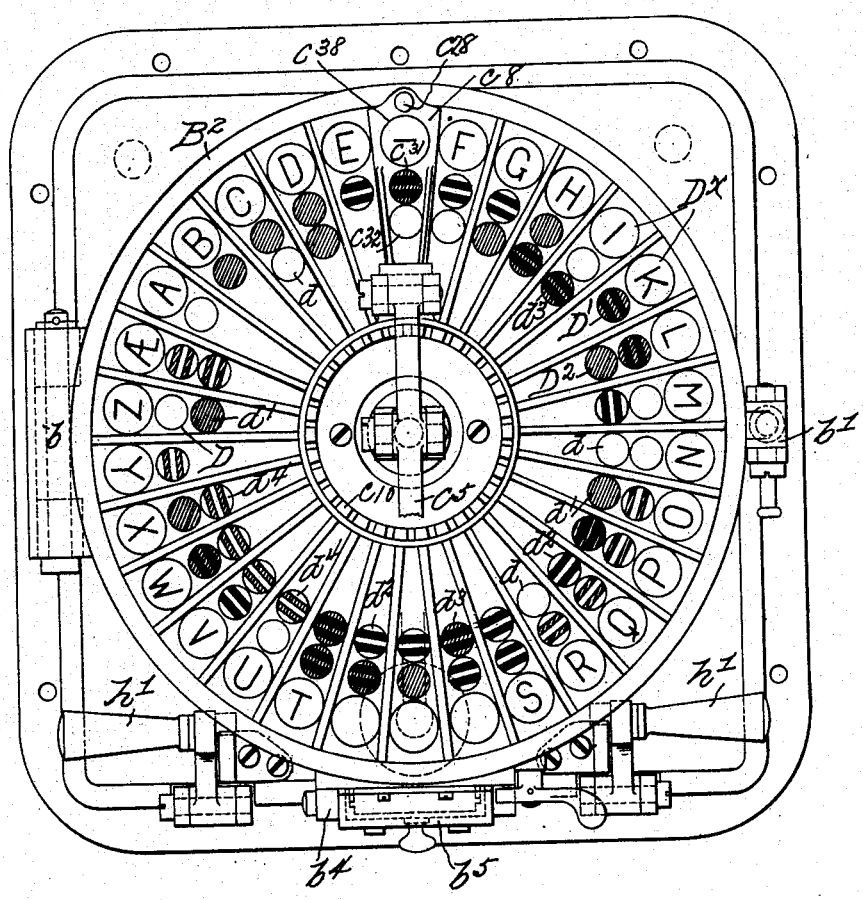
Witnesses  
P. S. Ober.  
B. K. Sommers
Inventor  
Leopold Sellner  
By Henry W...  
Attorney
THE NORRIS PETERS CO., PHOTO-LITHO., WASHINGTON, D. C.

No. 673,480. Patented May 7, 1901.
L. SELLNER.
APPARATUS FOR SIGNALING BY NIGHT.
(Application filed Apr. 3, 1897.)
(No Model.) 18 Sheets—Sheet 11.
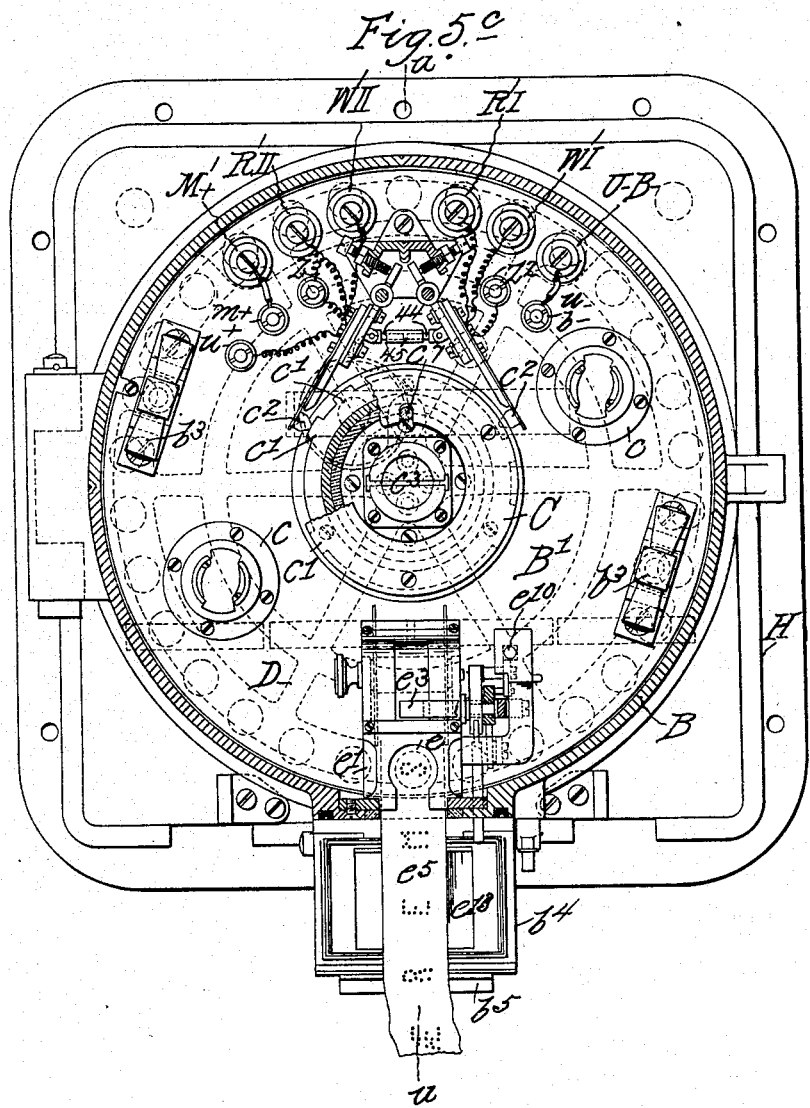

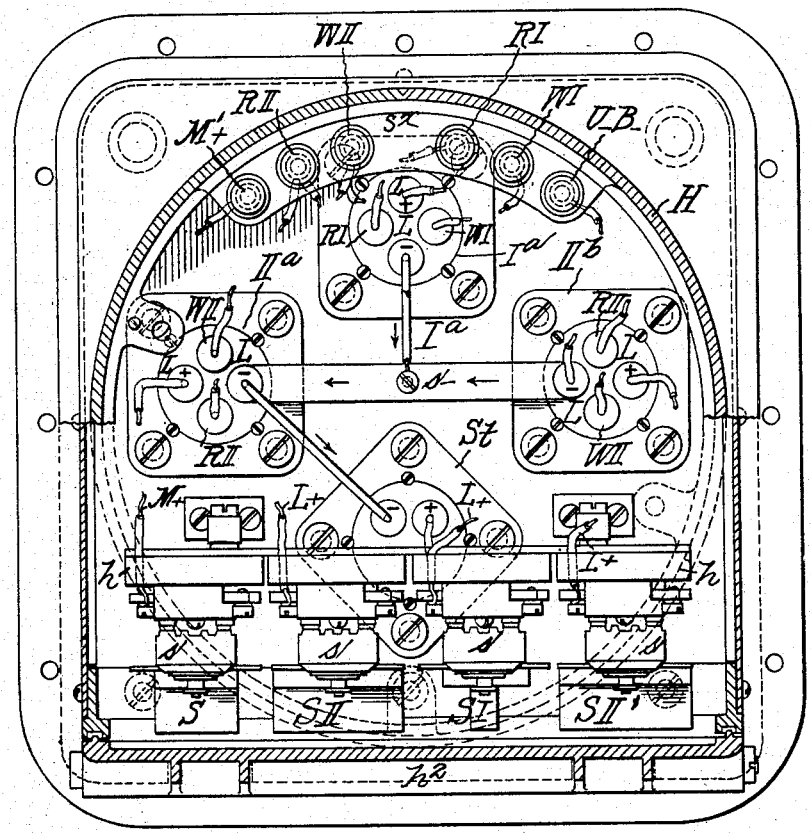

No. 673,480. Patented May 7, 1901.
L. SELLNER.
APPARATUS FOR SIGNALING BY NIGHT.
(Application filed Apr. 3, 1897.)
(No Model.) 18 Sheets—Sheet 13.
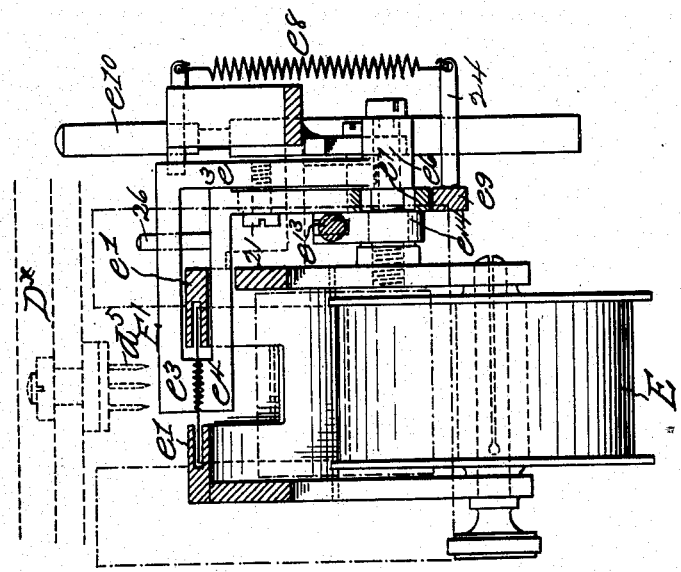
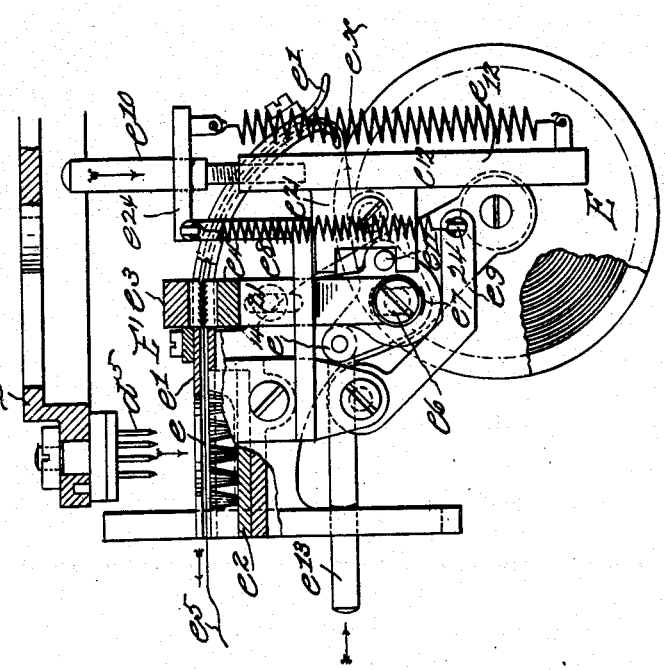
Witnesses:
B. S. Ober
B. K. Sommers
Inventor:
Leopold Sellner
By Henry Wits
Attorney No. 673,480. Patented May 7, 1901.
L. SELLNER.
APPARATUS FOR SIGNALING BY NIGHT.
(Application filed Apr. 3, 1897.)
(No Model.) 18 Sheets—Sheet 14.
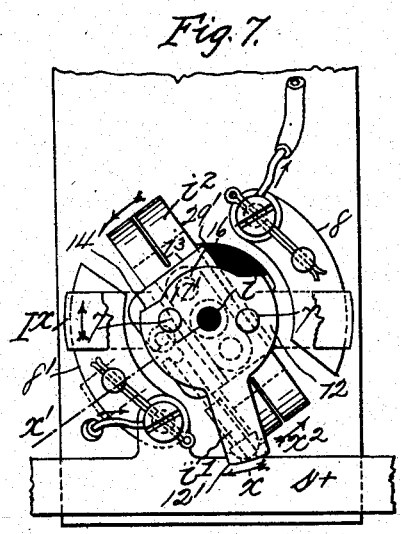
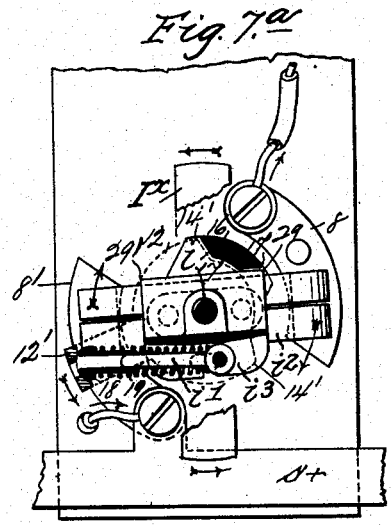
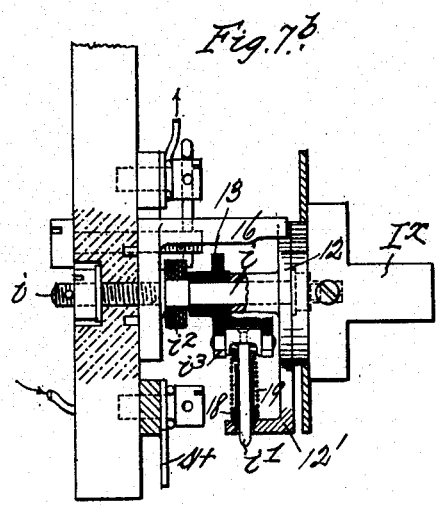
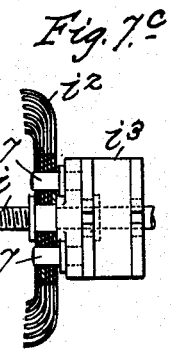
Witnesses
B. S. Ober.
C. H. Sommers
Inventor
Leopold Sellner.
By Henry W. —
Attorney
THE NORRIS PETERS CO., PHOTO-LITHO., WASHINGTON, D. C.

No. 673,480. Patented May 7, 1901.
L. SELLNER.
APPARATUS FOR SIGNALING BY NIGHT.
(Application filed Apr. 3, 1897.)
(No Model.) 18 Sheets—Sheet 15.

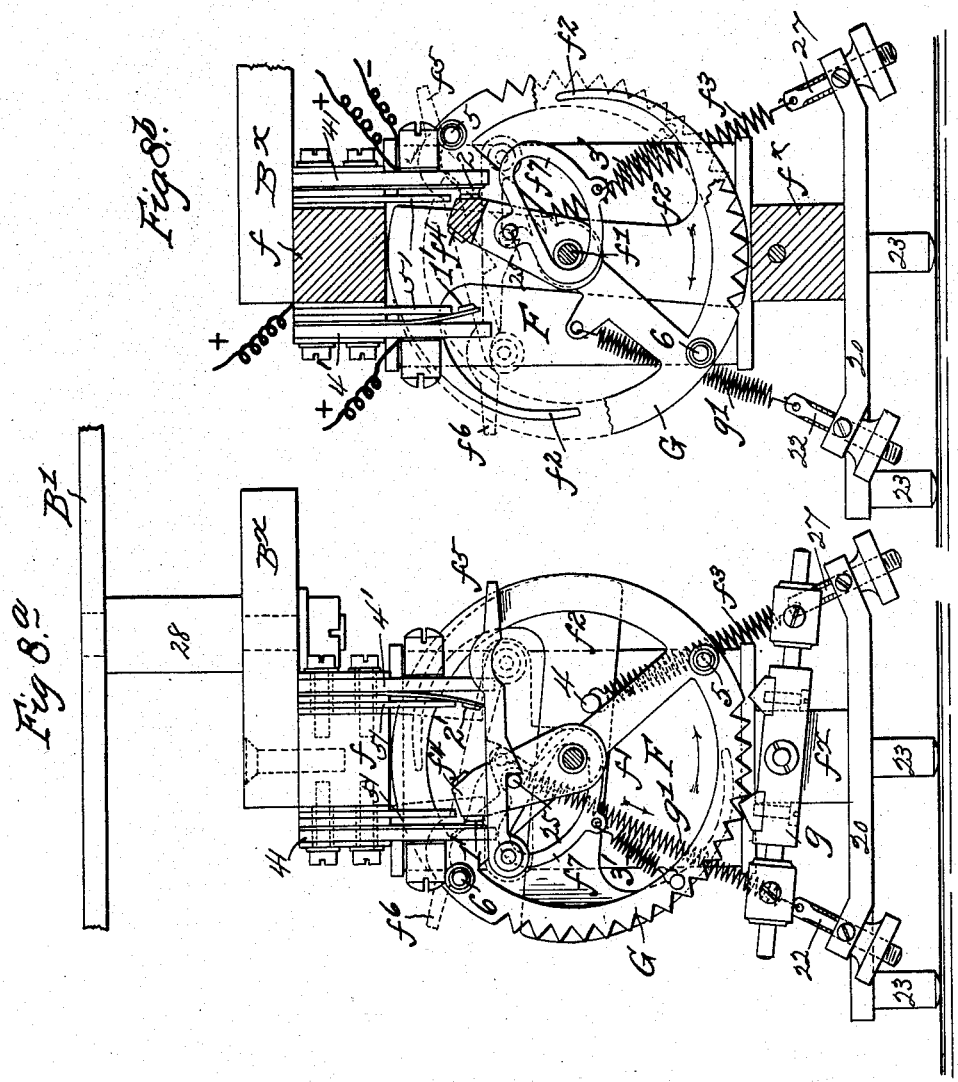

No. 673,480. Patented May 7, 1901.
L. SELLNER.
APPARATUS FOR SIGNALING BY NIGHT.
(Application filed Apr. 3, 1897.)
(No Model.) 18 Sheets—Sheet 17.
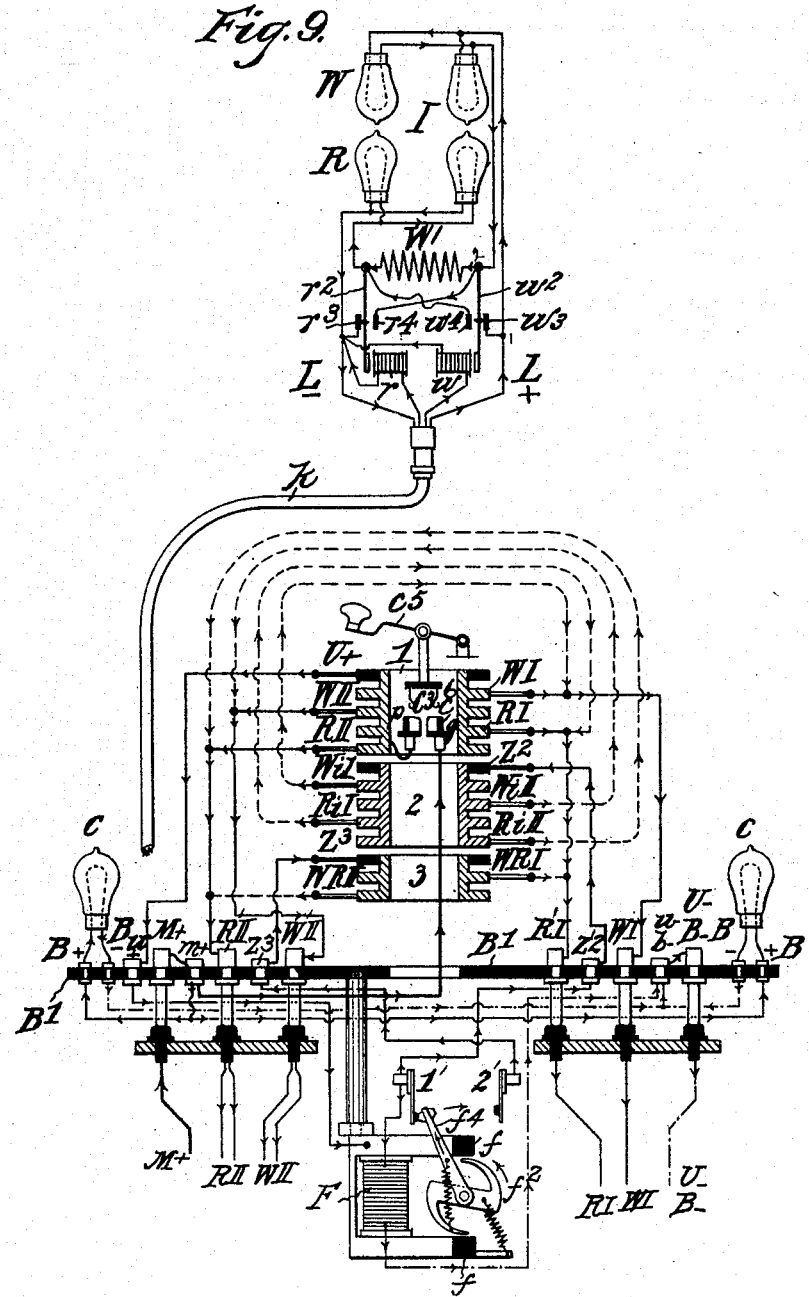

No. 673,480. Patented May 7, 1901.
L. SELLNER.
APPARATUS FOR SIGNALING BY NIGHT.
(Application filed Apr. 3, 1897.)
(No Model.) 18 Sheets—Sheet 18.
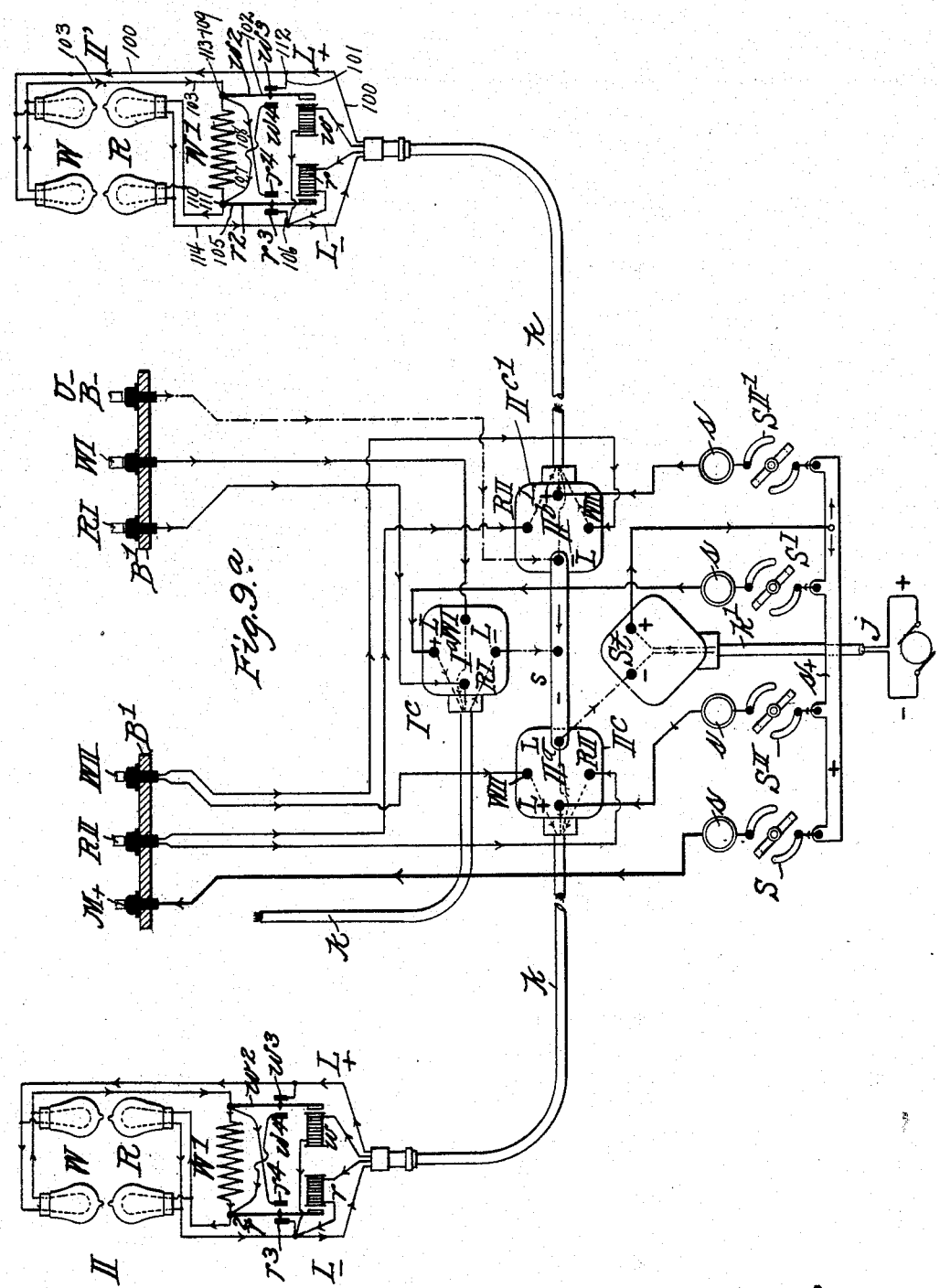

United States Patent Office.

LEOPOLD SELLNER, OF VIENNA, AUSTRIA-HUNGARY.

APPARATUS FOR SIGNALING BY NIGHT.

SPECIFICATION forming part of Letters Patent No. 673,480, dated May 7, 1901.

Application filed April 3, 1897. Serial No. 630,597. (No model.)

*To all whom it may concern:*

Be it known that I, LEOPOLD SELLNER, a subject of the Emperor of Austria-Hungary, residing at Vienna, in the Province of Lower Austria, in the Empire of Austria-Hungary, have invented certain new and useful Improvements in Apparatus for Signaling by Night; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention has for its object certain improvements in night signaling apparatus, such as shown and described in my application for patent filed March 28, 1896, Serial No. 585,248.

The apparatus may consist of a single signal element—*i. e.*, a lantern—having two signal-lights of unlike color—as, for instance, red and white—and so placed as to be visible from all points of the compass, the lantern being of course of cylindrical form in cross-section and having two uninterrupted light-transmitting zones. With such a lantern five signals only can be produced or made—namely, continuous white, continuous red, intermittent white, intermittent red, and alternate white and red. In order to increase the scope of the apparatus, I employ two such lanterns, whereby the number of signals can be increased to thirty, one of the lanterns being used for the five fundamental signals above mentioned and the two lanterns for complex signals—*i. e.*, signals composed of different signal-symbols—as, for instance, red and white, or red and red, or red and intermittent white, &c.—this being necessary in order that such signals may be readily distinguished from a distance, which would not be the case if they were produced or made in one and the same lantern, and for this purpose I locate the lanterns at a proper distance apart—as, for instance, at the head of a mast and near the ground or deck of a ship. Two such lanterns may, therefore, constitute a signal-station whenever it is possible to so locate the lanterns that the signals made can be seen from all points of the compass, which under most circumstances is desirable, if not absolutely necessary, both at sea and on land. Such an arrangement of two signal-lanterns on board ship is usually impossible, owing to upper-deck structures, &c., and in order that the signals may be seen from all points of the compass I employ three lanterns, one at a masthead and the other two fore and aft, as near the main or upper deck as possible, as shown in Figures 2, 2ª, 3, and 3ª, so that the signals made with the upper lantern I can be seen from all points of the compass and those made with each lower lantern II and II' over an arc of about two hundred and seventy degrees. In this case, therefore, three lanterns constitute a signal-station, each signal-symbol made in one of the lower lanterns, as II, being simultaneously made in the other lantern II' to render the signal made by the three lanterns visible from all points of the compass.

The thirty different signals which can be made or produced by the apparatus—*i. e.*, by means of two lanterns or by means of two lanterns and a third repeating lantern—are indicated in Fig. 5ᵇ and consist of the alphabet, the minus-sign, the diphthong "æ," together with three other signals of any desired kind, indicating, for instance, ship maneuvers, the index-spaces for such signals being left blank in said Fig. 5ᵇ.

The signals are made or produced by suitable appliances controlled by a transmitting-lever movable over the signal-indices on the cover of the transmitter-casing, means controlled by said lever being likewise provided for producing a permanent record of each signal made and exposing such record to view as the signals are made, so that they can be read by the operator and their accuracy ascertained at once. The intermittent and alternate color signals or signal-symbols are produced by means of an automatically-operated switch combined with means for determining the period of exposure and whereby such period of exposure is rendered uniform for all intermittent or alternate color signals or symbols, substantially as described in my application for patent above referred to.

The present invention has for its object certain improvements in the construction of the signaling-lanterns with a view to afford ready access to their interior parts and to readily fix them in their several positions and in the provision of means whereby a constant source of electric light is dispensed with by diverting the light-current from the incandescent lamps during the time intervening between the signals or signal-symbols or the time intervening between the sending of messages and while the light-circuit remains closed for the purpose of prolonging the usefulness of the incandescent-lamp filaments.

The invention has for its further object an improvement in the construction of the transmitter contact-cylinder or block to facilitate and simplify its connection with the automatically-operated switch for the production of intermittent or alternating color signals or signal-symbols and an improvement in the construction of the switch by means of which these signals are produced, so that it will perform the same function as the two switches described in my application above referred to.

The invention has for its further object certain improvements in the signal-recording mechanism with a view to simplifying the same and making it more compact; and finally the invention has for its object the arrangement of the transmitter, the recorder, the intermittent and alternate color-signal switches, and the main switches in one and the same casing adapted to be placed at any convenient point of a signal-station—as, for instance, on the bridge of a ship—the parts being so supported and arranged within said casing as to become readily removable and accessible without injury to the circuit connections.

The improvements above referred to are illustrated in the accompanying drawings, in which—

Figs. 1 and 1$^a$ show together in elevation a night-signal station comprising three signal-lanterns I, II, and II', together with the casing containing the transmitter, recorder, and switches, the source of electricity, as a dinamo $j$, being shown diagrammatically and may be located at any convenient point. Figs. 2 and 2$^a$ illustrate in elevation and plan, respectively, the arrangement of the signal-lanterns on a vessel having a single mast. Figs. 3 and 3$^a$ are views similar to Figs. 2 and 2$^a$, illustrating the arrangement of the lanterns on a vessel having two or more masts. Fig. 4 is a vertical section of a signal-lantern embodying my improvements. Figs. 4$^a$ and 4$^b$ are cross-sections of the lantern, taken, respectively, about on lines $y\,y$ and $z\,z$, Fig. 4. Fig. 4$^c$ is a detail view of one of the lantern-magnets. Fig. 4$^d$ shows the lantern in elevation with the inclosing casing lowered to afford access to the parts inclosed thereby, and Fig. 4$^e$ is a diagram of the lantern light-circuits and the electromagnetic cut-outs. Fig. 5 is a vertical sectional view of the transmitter-recorder and switch apparatus. Fig. 5$^a$ is a sectional elevation, and Fig. 5$^b$ a top plan view, of the apparatus shown in Fig. 5. Figs. 5$^c$ and 5$^d$ are cross-sections taken, respectively, about on lines $v\,v$ and $w\,w$ of said Fig. 5. Figs. 6 and 6$^a$ are detached sectional side and end views, respectively, of the signal-recorder. Figs. 7, 7$^a$, 7$^b$, and 7$^c$ are detached detail views of one of the circuit-switches. Figs. 8, 8$^a$, and 8$^b$ are detached detail sectional side and front views of the electrically-controlled switch for producing intermittent or alternating color-signals or signal-symbols, Figs. 8 and 8$^a$ showing the parts in the different positions they assume, and Figs. 9 and 9$^a$ show together a general diagram of the electric circuits and connections.

*The signal-lantern*, Figs. 4, 4$^a$, 4$^b$, and 4$^d$.— The lantern-body is composed of two parts A and A'. The latter part consists, essentially, of a circular dished casing $a^{21}$, open at top and having a circular opening in its bottom. Within this casing is arranged a circular stepped ventilator $a^4$ of well-known construction, whose parts are secured together and to an annular flanged protecting-ring $a^{20}$ by means of screws or bolts passing through spacing-sleeves $a^{24}$. These parts—namely, the annular dished ring $a^{21}$, the ventilator $a^{24}$, and the protecting-ring $a^{20}$—are connected, by means of tie-rods $a^8$, to a like ventilator $a^3$ at the lower part of the lantern, the lower disk $a^x$ of the lower ventilator $a^3$ being secured to a foot or bottom piece $a^2$ by means of a flanged sleeve $a^{11}$, that contains the contact devices for the various light-leads for the lamps, said footpiece having a depending sleeve $a^{13}$, that fits a suitable support, as an arm $a^{14}$, Figs. 1 and 1$^a$, secured to a mast, deck-house, or other stationary structure at the several points of the signal-station, so that the lanterns can readily be placed in position and removed and so that the light-transmitting zones of the upper lantern will be above the mast and afford an unobstructed view of the lantern from all points of the compass. The upper and lower ventilators are further secured to the footpiece $a^2$ by means of tie-rods $a'$. The two series or groups of incandescent lamps W and R are supported from rings R', secured to arms of a rectangular frame R$^2$, through which the tie-rods $a'$ pass and to which said frame is secured by means of set-screws $r^{21}$, Fig. 4$^a$. Above the upper group of lamps W is arranged a resistance-coil W', whose resistance is equal to that of one of the groups of lamps, for purposes hereinafter referred to, and between the two groups of lamps is arranged a partition $a$, composed of two smaller and an intermediate large ring, the smaller rings overlapping the inner edge of the large ring, while the latter does not contact with the lantern-casing A, while the ring-space of the upper ring is closed by a plate $a^{30}$, as shown in Fig. 4. In this manner the light from the lower group of lamps is effectually intercepted without interfering with the free circulation of air through the lantern.

From what has been said it will be seen that the lantern-casing A is absolutely independent of its interior parts and free to slide up and down and is held in its normal position by means of a spring-actuated hook or hooks $a^7$, that hook onto the ring $a^{33}$ of the lower ventilator $a^3$, Fig. 4. The lantern-casing may in this manner be lowered to afford ready access to the parts inclosed thereby, as shown in Fig. $4^d$.

The lantern-casing A is itself made in sections $A^2$ $A^3$ $A^4$, detachably connected together and provided with seats for the white and red glass rings $w'$ $r'$, the parts being rigidly connected by tie-rods $a^6$, hinged at $a^{46}$ to the lower lantern-section $A^4$, the upper end of said rods being screw-threaded and secured by means of suitable nuts and jam-nuts in slotted ears $a^{23}$, as shown in Fig. $4^d$, so that should a glass ring be broken another can be readily replaced by turning down the tie-rods $a^6$ and dismembering the casing. Of course if the lamps of group R are provided with red-glass bulbs both rings $w'$ $r'$ will be of plain white glass. I prefer, however, to employ a red-light-transmitting zone $r'$, because the light transmitted can be seen from a greater distance.

In signaling it may become desirable to obscure the light-transmitting zones $w'$ $r'$ in a given direction, to effect which I mount upon the tie-rods $a^6$ two segmental sliding shutters $a^9$ on diametrically opposite sides of the lantern-casing, adapted to be raised to cover and lowered to uncover a portion of the light-transmitting zones $w'$ $r'$ by means of suitable cords $a^{39}$, running over pins or rollers on brackets $a^{49}$, secured to the upper section $A^2$ of the lantern-casing A. The upper terminals of the tie-rods $a'$ are connected to a lightning-arrester $a^5$, Figs. 1, $1^a$, 4, and $4^d$, for obvious purposes.

In the lower part of the lantern are located two electromagnets, one, $w$, for the upper group of lamps (white light) and one, $r$, for the lower group of lamps, (red light,) that operate switches $w^2$ and $r^2$, respectively. When one of the electromagnets is energized or when both are alternately energized, their respective switches will be so displaced as to cut the resistance W', above referred to, out of the light-circuit to supply current directly to one or the other or alternately to one and the other group of lamps W and R. When the electromagnet $w$ alone is energized, a continuous or intermittent white-light signal or signal-symbol will be produced, according as the magnet-circuit remains closed or is alternately closed and opened through the agency of the electrically-controlled and automatically-operated switch hereinbefore referred to, which switch is itself controlled by the transmitting-lever, as will be hereinafter described. Similarly when the electromagnet $r$ is energized a continuous red or an intermittent red signal or signal-symbol is produced, and when both electromagnets are alternately energized an alternate white and red signal or signal-symbol will be produced, or, in other words, by suitably energizing the electromagnets $w$ and $r$ the five fundamental signals can be produced in a lantern, and by using two such lanterns the symbols can be so combined as to produce thirty signals, as hereinbefore set forth.

The current-supply leads WI and RI for the electromagnets $w$ and $r$, respectively, and the lamp-leads L+ and L− for the two groups of lamps W and R are formed into a cable $k$ and are connected to suitable contacts of a contact-block $a^{10}$, secured in the lantern-foot sleeve $a^{11}$, hereinbefore referred to, and to this contact-plug are connected the continuations of the leads WI RI and L+ L− for the electromagnets $w$ and $r$ of the two groups of lamps W and R, the connection being a separable one in that the terminals of the cable and lantern leads are electrically connected by spring-contacts $a^{12}$ (of a well-known construction, Fig. 4) and contact-plugs projecting from the contact-block $a^{10}$, so that the lantern can be completely dismembered without injury to the electrical connections.

*The lantern-circuits*, Fig. $4^e$.—When the apparatus is not in use, the signal-lanterns are cut out of the supply-circuit by suitable switches, hereinafter to be described. When temporarily out of use or during signal intervals and while the lantern-circuit is included in the supply-circuit, the two switches $w^2$ $r^2$ are in electrical connection with fixed contacts $w^3$ and $r^3$, respectively. The lamp-current then flows via wire 100, wire 101, contacts $w^3$ $w^2$, wire 102, points 113 and 109, resistance W', wire 104, point 110, point 111, wire 105, contacts $r^2$ $r^3$, wire 106 to L−, from which it will be seen that the current is short-circuited through the resistance.

To light the upper set of lamps, the resistance W' is cut out of circuit, which is broken at $w^3$, so that the current will travel from L+ directly to the upper series of lamps, point 109, wire 103, point 113, wire 102, contacts $w^2$ $w^3$; wire 107, points 110 and 111, wire 105, contacts $r^2$ and $r^3$, wire 106 to L−.

To send current to the lower set of lamps for red light, contact is broken at $r^2$ $r^3$ and the resistance cut out, current being sent direct to the lower series of lamps via L+, wires 100 and 101, contacts $w^3$ $w^2$, wires 102, point 113, wire 108, contacts $r^4$ $r^2$, wire 105 to lamps, back by wire 114 to L−.

The connections shown in Figs. 9 and $9^a$ for the lamps are substantially the same, the connections only being shortened to make the points 113 109 coincide, as well as points 110 and 111.

The conductors of the cables $k$ of the signal-station lanterns are connected to contact-blocks $I^a$, $II^a$, and $II^b$, Figs. $5^d$ and 9 and $9^a$, of switches in the transmitter-casing, by means of separable contacts constructed like the lantern-contacts, so that the mechanism within said casing may be removed without injury to the electrical connections.

In Fig. 5$^b$, which is a top plan view of the transmitter-casing, I have illustrated the arrangement of the signal-indices, the signals, and signal-symbols in three concentric rows, indicated on glass disks secured in suitable openings in the top B$^2$ of the casing, the outer row of disks D$^×$ having the signal-indices marked thereon, the intermediate and inner rows D$'$ and D$^2$, the signals and signal-symbols themselves, the blank disks $d$ indicating white light, the plain hatched disks $d'$ red light, the black and white striped disks $d^2$ intermittent white light, the black and hatched striped disks $d^3$ intermittent red light, and the white and hatched striped disks $d^4$ alternating white and red light, the electrical connections for the production of the various signals and signal-symbols being effected by means of a transmitting-lever $c^5$, revoluble and vertically movable on the casing-top and provided with a pointer $c^8$, having a stud or projection $c^{28}$, by means of which the said lever is rotated, and a knob by means of which it is lifted out of and depressed into the teeth of the crown-wheel C$^{10}$, substantially as shown and described in my application for patent hereinbefore referred to, the pointer $c^8$ in this construction being provided in the plane of the circle of signal-indices with a glazed opening $c^{38}$, the glass disk being preferably a green one, so as to be readily distinguishable from said signal-indices in the dark, and when said indices are illuminated and in rear of said glazed opening $c^{38}$ there are two openings $c^{31}$ $c^{32}$ in the pointer above the two circular rows D$'$ D$^2$ of signals and signal-symbols.

As shown in Fig. 5, the transmitter, recorder, and switches are all contained in one and the same casing, divided into two superposed compartments H and B, the upper one B containing the transmitter and recorder and the lower one H the switch mechanisms. By arranging the said parts in one and the same casing with the transmitter the number of cables which would otherwise be required is reduced by one, the length of the electric connections between the switch-box and transmitter shortened to a minimum, ready access afforded to all the connections and switches, and the space occupied by the devices is reduced to the greatest possible extent. The upper compartment B is divided from the lower compartment H by a horizontal partition B$'$, that is seated on and detachably secured to a circular flange $b^{30}$ or to ears or projections on said flange projecting from the inner face of said upper part of the casing by means of handled screw-rods $b^3$, Figs. 5$^a$ and 5$^c$, that screw through said partition and flange, said rods having collars $d^{33}$. The screw-rods pass through bridge-pieces $b^{31}$, against which the collars bear when the rods are unscrewed from the flange, so that by means of the handles on the screws the plate B$'$ and parts secured thereto can be lifted out of the casing. To this end the upper compartment B is formed of two parts hinged together at $b$ and adapted to be securely locked by means of screw locking-bolts $b^{21}$, working in a strap $b'$ and fitting into a recess in a locking-stud $b^{22}$, projecting from the lower stationary part of said upper portion B of the casing, as shown in Fig. 5$^a$. The front of the lower part of the casing where the handles or levers of the main switches S SI SII SII$'$ are located is open and adapted to be closed by a door $h^2$, Fig. 5. The upper part B of the casing is detachably secured to the lower part H by means of screws 46, Fig. 5, and the hinged portion of said upper part B has an opening $b^{24}$ in its vertical wall in the plane of feed of the record-ribbon and in the plane of the lamps $c$ in the casing, said opening adapted to be closed by a door $b^4$, having on its inner face a reflector $b^{14}$ and being provided with a drawer $b^5$, adapted to contain a signal note-book or a signal code-book, or both, the door being so hinged as to lie at an angle to the vertical wall of the casing when fully open, as shown in Fig. 5. Finally all the exposed points, as the door-joints and the joint between the two parts of the upper casing, are suitably packed to prevent access of dirt or dust to the contained mechanisms.

*The signal-transmitting appliances*, Figs. 5, 5$^a$, 5$^b$, and 5$^c$.—These appliances consist of the transmitting-lever $c^5$, above mentioned, a contact-cylinder C, and the switch for automatically producing intermittent and alternate color-signals or signal-symbols. To the transmitting-lever $c^5$ is secured a spindle $c^4$, that constitutes its axis of rotation, said spindle passing through a suitable stuffing-box $c^{34}$ in the top B$^2$ of the casing B and carries at its lower end the resilient cut-out $p$, that coöperates with the two-part conductive sleeve $q$, the parts of which are electrically connected with the supply-lead and the contact-cylinder C and whereby whenever the lever is being shifted the said contact-cylinder is cut out of the circuit, as fully described in my aforesaid application.

The contact-cylinder C is of an improved construction and differs, therefore, from the cylinder shown and described in my said application. It is mounted to revolve on a suitable sleeve C$^6$, secured to partition B$'$, within which sleeve the two-part contact $q$ is supported.

The contact-cylinder C is constructed as follows, reference being also had to Fig. 9: The cylinder is made up of as many contact-rings as will be necessary to produce the thirty signals and three current-supply rings, said contact-rings having contact teeth or projections located so as to correspond with the signals on the signal-board B$^2$ when in a normal position relatively to their respective contact springs or brushes, the said cylinder being revolved by means of a pin $c^7$, secured to a radial arm on the spindle $c^4$ or preferably to the signal-record producer or wheel $D^\times$.

The contact-cylinder C is divided into three groups—1, 2, and 3—of contact-rings, which groups are insulated from one another. The upper group 1 consists of a contact-ring U+, that supplies current to the appliances which operate the switch for producing intermittent or alternate color-signals or signal-symbols and of four contact-rings WI RI WII RII for producing continuous signals. The group 2 consists of a supply-ring $Z^2$ and four contact-rings WiI, RiI, WiII, and RiII for producing the intermittent signals or signal-symbols, while the lower group 3 consists also of a current-supply ring $Z^3$ and two contact-rings WRI and WRII for producing the alternating color-signals or signal-symbols in conjunction with my improved switch and switch-operating mechanism.

Referring more particularly to Fig. 9, the described contact-rings are employed for the following purposes:

Group 1.

U+, supply-circuit, including intermittent and alternate signal-switch-operating mechanism.

WI, white,
RI, red,   } continuous, Lantern I.

WII, white,
RII, red,  } continuous, Lanterns II and II'.

Group 2.

$Z^2$, current-supply.

WiI, white,
RiI, red,   } intermittent, Lantern I.

WiII, white,
RiII, red,  } intermittent, Lanterns II and II'.

Group 3.

$Z^3$, current-supply.
WRI, alternate white and red, Lantern I.
WRII, alternate white and red, Lanterns II and II'.

The projections or teeth $c'$, Fig. $5^c$, on the contact-rings move in the path of contact springs or brushes $c^2$, which are preferably arranged in two groups and to which the circuit leads are connected, as will be described hereinafter. The spring-contact carriers are here also pivoted to a suitable support, and their movement away from the contact-rings is here also limited by screws bearing on legs or arms projecting from said carriers, as shown and described in my application for patent and as shown in Fig. $5^c$; but instead of using springs for the purpose of connecting the two brush or contact carriers I employ a non-resilient but adjustable connection consisting of pins 44, having right and left screw-threads, respectively, and working in a similarly-threaded sleeve 45, as shown in said Fig. $5^c$, said screw-pins being articulated to the brush or contact carriers.

The magnet-current lead M+, controlled by a switch S, is connected to a separable contact-terminal M'+, Fig. 5, of a well-known construction, the continuation of said lead being connected through a binding-post $p+$ and a conductive rod $r+$ with the right half of the two-part conductive sleeve $q$ of the cut-out $p\,q$ and therethrough with group 1 of contact-ring C whenever the transmitting-lever is depressed to make contact between $p$ and $q$.

On the transmitter-partition B' are arranged besides the separable terminal M'+ five other terminals R'II, W'II, R'I, W'I, and U— B—, Fig. $5^c$, all of which are separable or spring-plug contacts similar to the one M'+ shown in section on the right of Fig. 5, one-half of said terminal being arranged on a ledge or shelf $s^\times$, formed on or secured to the lower portion H of the transmitter-casing, Fig. $5^d$, so that the partition can be readily lifted out of the casing to obtain access to the parts below the same.

The circuits and circuit connections will be presently described in reference to Figs. 9 and $9^a$.

*The signal-recorder*, Figs. 5, $5^c$, 6, and $6^a$.— The signal-recorder is supported from the upper hinged part of the upper portion B of the transmitter-casing, so that when said part is swung open access can readily be had to the recording mechanism. This mechanism consists, essentially, of a record-producer and a record-ribbon-feed mechanism, the producer consisting of a record-producing wheel $D^\times$, fast on the spindle $c^4$ of the transmitting-lever $c^5$ and of such a diameter that the signal-indices $d^5$, formed of perforators, (needles,) will be as near as possible to the opening $b^{24}$ in the vertical wall of the upper portion B of the transmitter-casing, so that each signal after being recorded in the record-ribbon and before a succeeding signal can be recorded will be rendered visible outside of the transmitter-casing, such ribbon being automatically fed and traveling step by step in synchronism with and through the agency of the transmitting-lever $c^5$ over the door $b^4$ for the casing-opening $b^{24}$, substantially as described in my application for patent hereinbefore mentioned.

The ribbon-feed mechanism is shown more particularly in Figs. 6 and $6^a$, in which E indicates the ribbon reel or drum, and $e^5$ the paper ribbon. $e'$ is a guide that guides the ribbon, said guide having an opening proximate to that $b^{24}$ in the vertical wall of the transmitter-casing immediately below the signal-indices $d^5$ on the under side of the recording-wheel $D^\times$, below which opening is arranged a brush $e^3$.

In the production of a perforated record it is necessary that the paper ribbon be stretched more or less taut in order to obtain a clear cut and clear record; but this is apt to result in the tearing of the ribbon unless the stretching devices are very accurately adjusted. This is avoided by the use of the brush, whereby I provide a resilient or yielding support or pad for the ribbon, into which the needles readily penetrate without injury to or blunting of their points. The ribbon receives a step-by-step feed motion through the medium of a clamp E', whose jaws $e^3$ $e^4$ are loosely mounted on one and the same pivot $e^6$, the lower jaw $e^4$ being provided with a longitudinally-elongated pivot bearing or slot $e^7$, whereby motion toward and from the upper jaw $e^3$ can be imparted to said lower jaw $e^4$ to open and close the clamp through the following instrumentalities: The lower jaw $e^4$ has an enlargement or projection, through a perforation of which projects a pin $e^{11}$, secured to the short arm of a bell-crank lever $e^{14}$, loose on the paper-clamp spindle or pivot $e^6$, said pin $e^{11}$ lying in the path of a forked projection $e^{21}$ on a vertical bar $e^{12}$, into the upper end of which is screwed a stud $e^{10}$, adapted to be depressed by the recording-wheel $D^\times$ whenever the transmitting-lever $c^5$ is positioned to transmit a signal—that is to say, whenever the said lever is lifted, then shifted, and again depressed—the said bar $e^{12}$ being returned to a normal position after having been depressed by a spring $e^\times$, one end of which is secured to a fixed support $e^{24}$ and the other to a stud projecting laterally from the bar $e^{12}$, at its lower end. During the downward movement of the bar $e^{10}$ the upper branch of the forked piece $e^{21}$ impinges upon the aforementioned pin $e^{11}$, thereby moving the lower jaw $e^4$ away from jaw $e^3$, but owing to the distance the said upper branch of the forked piece $e^{21}$ has to travel before it can impinge upon pin $e^{11}$ the opening of the jaws will not occur until after the signal transmitted by the depression of the transmitting-lever and therethrough the recording-wheel has been recorded. Simultaneously with the opening of the jaws $e^3$ $e^4$ of the ribbon-clamp E' said clamp is tilted or turned inwardly by the action of the forked piece $e^{21}$ upon pin $e^{11}$, the two jaws of the clamp being connected by a screw 21, that passes through a longitudinal slot of jaw $e^4$. The lower end of the latter jaw has bearing upon a lever $e^9$ held in a normal position to close the clamp-jaws by a spring $e^8$, having one end connected to the fixed support $e^{24}$ and the other to an arm 24, projecting from said lever, so that when said jaw is depressed, as described, the spring $e^8$ is brought under tension. When the transmitting-lever is again lifted, and therewith the recording-wheel, both the bar $e^{12}$ and lever $e^9$ under the stress of their respective springs are returned into their normal positions, thereby closing the clamping-jaws and simultaneously therewith tilting the clamp back to its normal position or toward the opening $b^{24}$ in the vertical wall of the transmitter-casing, (direction of arrow, Fig. 6,) thus feeding the paper ribbon to present a fresh surface for the recording of the next signal. The amplitude of oscillation of the clamp E' is such as to move the recorded signal to the outside of the transmitter-casing over the reflector $b^{14}$ on the inner face of the door $b^4$, Figs. 5 and 5ᶜ, for purposes stated. The clamping-jaw $e^4$ is guided in its movements toward and from the jaw $e^3$ by a pin 26, Fig. 6ᵃ, secured thereto and passing freely through a perforation in jaw $e^3$.

In order that the ribbon-feeding mechanism may be locked out of operation when the door $b^4$ is closed and in case the transmitting-lever $c^5$ should then be shifted from one position to another, I provide a push-rod $e^{13}$, connected with the longer arm of the bell-crank lever $e^{14}$, hereinbefore referred to, which push-rod projects through the vertical wall of the transmitter-casing or its opening $b^{24}$ and is pushed inward by the door $b^4$, closing the said opening, whereby the pin $e^{11}$ is moved downward, and with it the bar $e^{12}$ and its stud $e^{10}$, out of reach of the recording-wheel $D^\times$ when depressed by the transmitter-lever $c^5$.

The object of making the actuating-bar $e^{10}$ $e^{12}$ in two parts adjustably secured together is to provide a means for accurately adjusting the same relatively to the recording-wheel $D^\times$.

It is obvious that as the record-ribbon $e^5$ moves over the reflector $b^{14}$ on door $b^4$ the recorded signal will become visible, said ribbon being illuminated by the light emitted from the lamps $c$ in the transmitter-casing and reflected by the aforesaid reflector $b^{14}$.

*The switch for producing the intermittent white and red and the alternate white and red signals or signal-symbols*, Figs. 5, 8, 8ᵃ, and 8ᵇ.—As shown in Fig. 5, this switch is supported and insulated from the under side of the partition B' of the transmitter-casing B H by a bracket B$^\times$, bolted to a pillar 28, depending from said partition B', so that said switch and its operating mechanism can be lifted out of said casing with the partition, from which it may then be removed, if necessary, for any purpose.

Referring more particularly to Figs. 8, 8ᵃ, and 8ᵇ, F indicates an electromagnet; $f f^\times$, its pole pieces or shoes, mounted on a base 20, provided with feet 23, so that when the switch is removed from the casing B H and detached from the partition B' the said base and feet will act as a stand for the switch. To the pole-shoe $f$ of the electromagnet F are secured bracket-arms $f^{21}$ $f^{21}$, in which is journaled a spindle $f'$, that carries a Z-shaped armature $f^2$, free to vibrate or oscillate on said spindle between the aforesaid electromagnet pole-shoes $f f^\times$. The armature is held in a normal position of rest, Fig. 8, by means of a spring $f^3$, one end of which is secured to a stud 4 of the armature $f^2$ and the other to an adjusting-screw 27 in the switch-base 20 so long as the electromagnet is demagnetized—that is to say, so long as no current is passing therethrough. To the upper pole-shoe $f$ are also secured two insulated spring-contacts 1' and 2', whose movements in one or the other direction are limited by suitably-arranged abutment bars or plates 4' 5', and between said contacts is arranged a forked switch-lever $f^4$, loose on armature-spindle $f'$, said switch-lever being locked in one or the other of its extreme positions by two gravity-pawls $f^5$ $f^6$, pivoted to a T-shaped bracket-plate $f^{26}$, Fig. 5, and adapted to engage a stud 25, projecting from the switch-lever $f^4$.

For the purpose of determining the duration of exposure of each intermittent and each alternating color signal-symbol there is pivoted to the stud 25 in the fork of the switch-lever an ellipsoidal strap $f^7$, through which passes the armature-spindle $f'$, which thus serves to limit the movements of said strap from one side to the other. The strap $f^7$ is connected by a spring 3' with a partially-toothed escapement-wheel G, controlled by a vibrating or rocking weighted pallet-lever $g$, provided with suitable pallets adapted to alternately engage the teeth of the said escapement-wheel. The arrangement of these parts is such that when the electromagnet is not energized and the armature $f^2$ is in its normal position the escapement-wheel G will be held by the pallet-lever $g$ and the stud 4 on said armature in the position shown in Fig. 8$^a$, whereby the wheel-spring $g'$ is placed under tension, said spring having one of its ends connected with an adjusting-screw 22 in the switch-base 20.

The operation of the switch is as follows: In the production of intermittent-color signals or signal-symbols when the electromagnet F is energized by current passing therethrough the armature $f^2$ is suddenly attracted, assuming the position in which it is shown in Fig. 8$^b$, whereby its spring $f^3$ is placed under tension. By this movement of the armature the escapement-wheel G is released and under the stress of the spring and the retarding influence exerted by the pallet-lever $g$ is slowly swung from its position to the left, Fig. 8$^a$, into the position to the right, Fig. 8$^b$, carrying with it the ellipsoidal strap $f^7$. As the escapement-wheel is about to reach its said position to the right the stud 5 thereon impinges upon the free end of the gravity-pawl $f^5$ and lifts the same, thereby releasing the switch $f^4$, which under the stress of the strap-spring 3' is rapidly thrown over toward the right into contact with the contact-spring 2', thereby interrupting the intermittent-light circuit and demagnetizing the electromagnet F, whereat the armature $f^2$, and with it the escapement-wheel G, return into their normal position, Fig. 8$^a$, while the switch $f^4$ is prevented from following this movement of the armature and wheel by the gravity-pawl $f^6$, which engages its stud or pin 25 as soon as said switch has made contact with the contact-spring 2'. As soon, however, as the wheel G is about to reach its normal position, Fig. 8$^a$, its stud 6 engages the free end of gravity-pawl $f^6$ and lifts the same out of engagement with the switch stud or pin 25, whereby said switch under the stress of its strap-spring 3' is again thrown to the left into contact with the contact-spring 1' to again close the circuit, these operations being repeated so long as the transmitting-lever is set to an intermittent signal or signal-symbol. It will readily be seen that the duration or time of exposure or the time during which the light is rendered visible is determined by the escapement and is a uniform one for all intermittent-color signals or signal-symbols. When, however, alternating-color signals or signal-symbols (as white and red) are to be produced, the movement of the switch $f^4$ to the right will close the electric circuit, including group 3, of the contact-cylinder through contact-spring 2', whereby the red-light signal or signal-symbol is produced, while the movement of said switch to the left will close the said circuit through contact-spring 1', whereby a white-light signal or signal-symbol will be produced, the time of exposure of the alternating-color signals being of course also determined by the escapement.

To the base-plate of the lower or switch box H of the transmitter-casing are secured three sleeves I$^a$ II$^a$ II$^b$ for the separable or spring plug-contacts of the upper lantern I; and the conductors of the four-strand or core cables $k$ for the two lower lanterns II and II', said contacts being of the same construction as the lantern-contacts. There is, furthermore, a fourth sleeve S$t$, containing like contacts for the two supply conductors or leads of a cable $k'$, connected with the dynamo $j$, and, as hereinbefore stated, there is a segmental shelf $s^x$ in said switch-box H, on which are arranged the lower half of the separable terminal contacts M'+, R'II, W'II, R'I, W'I, U— and B—, Fig. 5$^d$, the upper half of which is arranged on the partition B' of the casing B H, as shown in Fig. 5$^c$. In the switch-box H is arranged a hard-rubber plate or plates $h$, Fig. 5$^d$, facing the opening in the front wall of said box, on which plate or plates are arranged the four switches S SI SII SII', corresponding with the four cable plug-contacts, said switches, together with a lead-fuse $s$ for each, being included in the supply-leads; ready access being had to the switches through the door $h^2$, closing the opening in the front wall of box H, and hereinbefore referred to.

*The main switches*, Figs. 7, 7$^a$, 7$^b$, and 7$^c$.— I prefer to use main switches in the form of spring-contacts constructed as follows: The switch handle or lever I$^x$ for these switches is loosely mounted on or pivoted to a spindle $i$, on which is loosely mounted the contact-brush $i^2$. The said handle or lever has rigidly connected therewith a disk 12, provided with an L-shaped radial arm 12', in which is formed an opening for a pin $i'$, that is pivoted in a radial bracket or crank $i^3$ on a disk 13, also mounted on the spindle $i$. The radial arm 12' has formed around the opening for the pin $i'$ a concave seat for the enlarged convex end of a sleeve 18, through which said pin $i'$ passes, and between the shoulder formed by the enlarged end of the sleeve and the cross-head for the pin is arranged a coil-spring 19. By means of this arrangement I am enabled to use a comparatively short pin $i'$, capable of being elongated and possessing elastic properties for purposes presently to be described. The disk 12, opposite its radial arm 12', is so shaped as to form stop-faces 14 14', adapted to contact with correspondingly-inclined stop-faces 17 17' of a fixed stop 16, according as the handle $I^x$ is turned to the left or right, thereby limiting the amplitude of rotation of the switch-handle. This fixed stop 16 also serves as an abutment for the crank $i^3$, whose corners 29 29' respectively abut against the faces 17 and 17' of the stop 16, according as the switch-handle $I^x$ is turned toward the left or right. The disk of crank $i^3$ is connected with the contact-brush $i^2$ by means of pins 7, so that when the switch-handle $I^x$ is turned in the direction of arrow $x$, Fig. 7, in which movement the crank $i^3$ cannot partake, because its corner 29' will then abut against the face 17' of the fixed stop 16, while the radial arm 12' of disk 12 will partake of said movement until it lies in the plane indicated by the dot-and-dash line $x'$, Fig. 7. During this movement of the radial arm 12' the distance between the bearing of sleeve 18 and the cross-head of pin $i'$ will be shortened—that is to say, the pin and its sleeve are telescoped together, whereby the coiled spring 19 is compressed. Upon a further rotation of the switch-handle and disk 12 in the same direction (arrow $x$) the radial arm 12' is moved beyond or above the line $x'$, or into a position in which the axis of rotation of the pin $i'$ will lie to the right of the axis of the switch-spindle $i$, and the pin $i'$ under the stress of the coiled spring 19 will be moved out of its sleeve 18—i. e., the pin will be lengthened—thereby moving the crank $i^3$ toward the right and therethrough the contact-brush $i^2$, (arrow $x^2$, Fig. 7,) whereby the circuit is closed through the contact-plates 8 and 8', in which position the nose 14' of the disk 12 will abut against the face 17' of the fixed stop 16. Inasmuch as the coiled spring exerts its power suddenly, the moment the pin $i'$ and its sleeve reach the proper position the contact-brush will be suddenly thrown around to close the circuit. Precisely the same operation takes place when the switch-handle $I^x$ is turned back from right to left, (arrow $x^2$, Fig. 7,) during which movement the further rotation of the crank $i^3$ will first be stopped by contact of its corner 29 with the face 17 of the fixed stop, after which the telescopic pin $i'$ 18 will be shortened and its spring 19 compressed, and finally when the axis of the telescopic pin lies in a substantially horizontal plane in a direction the reverse of that shown in Fig. 7$^a$, with its axis of rotation to the left of the axis of rotation of switch-spindle $i$, the coiled spring 19 will exert its power to lengthen the pin, thereby throwing the crank $i^3$, and with it the contact-brush $i^2$, from left to right back into its normal position, Fig. 7, to interrupt the electric circuit, the nose 14 on disk 12 then abutting against the face 17 of the fixed stop 16.

*The electric circuits*, Figs. 9 and 9$^a$.—In this diagram the return-leads are shown in dotted lines. In signaling the switches S SI SII SII' will first be set to close their respective circuits. Current will now flow from dynamo $j$, the plus-lead of cable $k'$ to a collecting-bar $s +$, and thence to the switches above referred to; from the switches to the lead-fuses $s$ as an illuminating-current L+, through the plug-contacts I$^a$ II$^a$ II$^b$, through the + lead of the three lantern-cables $k$ to the lamp-circuits therein, and through the resistances W and W' thereof back to collecting-bar $s -$ and - pole of dynamo, all of the other circuits being interrupted by the cut-out $p$ $q$ of the transmitter.

The current from dynamo $j$ through switch S and its lead-fuse $s$ flows as a magnetizing-current to plug-contact M+, terminal $m+$ below plate B' to the cut-out $p$ $q$, and when the latter is closed to group 1 of contact-rings of cylinder C. From the lead M+ there is a branch lead through terminal $m+$ to the illuminating-lead B+ for the transmitter-lamps $c$, while the return illuminating-lead B- passes through terminals $u - b -$ to plug-contact U- B-, and thence to bar $s -$. From the contact-rings WI, RI, WII, RII for continuous white or continuous red light of group 1 of the contact-rings of cylinder C—that is to say, from the corresponding rubbing-springs—leads are carried to the similarly-named contacts W'I, R'I, W'II, R'II, and from these through the plug-contacts I$^c$, II$^c$, II$^{c'}$ of the lantern-cables to the electromagnets $w$ and $r$ of lanterns I, II, and II'. The return-lead of the lantern-electromagnets is connected to the return-light lead L-. The magnet-leads WII RII are carried along in duplicate from the similarly-named switch-terminals in the switch-box in order that one and the same signal or signal-symbol will be simultaneously produced in the lower lanterns II and II'. From the intermittent alternating signal-switch contact-ring U+ of group 1 of contact-rings the magnet-current U+ passes to a terminal $u-$, and then to the pole-shoe $f^x$ of electromagnet F of said switch, from thence through the closed contact $l'$ and a terminal $z^2$ to the current-supply ring Z$^2$ of the group 2 of contact-rings of cylinder C—that is to say, to the four contact-rings for white and red intermittent signals WiI, RiI, WiII, RiII. A branch lead passes from the closed electromagnet-contact $l'$ to the electromagnet F and back to the return-lead $u - b -$. The leads of the contact-springs $c^2$ for the contact-rings of the said group 2, WiI, RiI and WiII, RiII, are connected to the leads WI, RI, WII, RII of the first group, because so long as intermittent signals are given no permanent signals can be set by means of the contact-rings of the first group. From the second contact 2' of the circuit of the electromagnet F the lead for the magnet-current passes through the terminal $Z^3$ to the connecting-disk $Z^3$ of group 3 of contact-rings WRI, WRII of the contact-cylinder C for alternating white and red signals or signal-symbols. The leads of these contact-rings are also connected to the leads of contact-rings RI and RII of group 1. The contact-rings of group 3 contain only the contacts for the red lights belonging to the alternating signals, while the corresponding contacts for white light are arranged in the contact-rings WiI and WiII of group 2 for intermittent light.

The following is the operation in signaling: Assuming the signal-lever $c^5$ to be set for a continuous white-light signal (signal A of the signal-board, Fig. $5^b$) in the lantern I, whereby the signal-lever cut-out or contact $p$ $q$ and a contact of the contact-ring WI of the first group are connected, then the magnet-current will pass direct from the contact-ring WI through the plug-contact W'I and through the lantern-cable to the electromagnet $w$ of the lantern I, by the energizing of which the resistance W' is cut out, as hereinbefore described, and the lighting-current passes into the group of glow-lamps W for white light. In the same manner a red continuous-light signal (signal B of the signal-board) is given merely by operating the contact-ring RI. The same holds good for the lanterns II II' (signal D) when the contact-rings WII RII are included. If, for example, in the upper lantern I a red continuous-signal symbol and in the lanterns II and II' a white continuous-signal symbol (signal C on the signal-board) are to be given, then two contact-rings RI and WII are included. For intermittent-light signals the contact-ring U+ for the switch-electromagnet F and also the desired contact-ring of the second group are included. If, for example, the contact-ring WiII (signal M) is included, the magnet-current passes, in order to give the intermittent signal, through the contact-ring U+ for the switch-electromagnet F to said electromagnet, through the closed contact 1' thereof to the supply-disk $Z^2$ of the second group, through the included contact WiII to the lead W'II of the first group, and to the electromagnets $w$ of the lanterns II II'. If the contact 1' of electromagnet F is interrupted by the operation of the switch $f^4$, then, as the current cannot pass through contact 2' to the group 3, both the electromagnet F and the energized lantern-electromagnet $w$ of the lanterns II II' are without current, whereby the groups of lamps for white light are extinguished until the said switch $f^4$ has again returned into the position of rest, whereupon the operation begins anew. For white and red alternating-signal symbols (for example, in the lanterns I, II, and II', signal AE of the signal-board) the relay contact-ring U+ and the contact-rings WiI and WiII of the second group are included for white intermittent light and the contact-ring WRI and WRII of the third group are included for red intermittent light. The circuit for white light (WI WII) is the same as above described up to the switching of the switch $f^4$. If the switching is effected, the magnet-current is not interrupted, as above described, but is led to the current-supply disk $Z^3$ of the third group, whereby the electromagnets $r$ in the lanterns I II II' are energized and the lighting-current is led into the group of lamps R, designed for red light, until the switch $f^4$ is operated to remake the circuit at contact 1'.

In conclusion it may be mentioned that the lantern resistances and the lantern-electromagnets of the lanterns I II II' of a signaling-station may also be arranged outside of the lantern in the switch-box or on the base-plate of the transmitter.

Having thus described my invention, what I claim as new therein, and desire to secure by Letters Patent, is—

1. A lantern comprising top and bottom sections, tie-rods connecting the same rigidly, an illuminating device or devices supported from said tie-rods, and a shell composed of transparent and non-transparent sections and tie-rods connecting the same rigidly, said shell encompassing the bottom section of the lantern and extending to its top section and adapted to be moved bodily from said top section over and off said bottom section, for the purpose set forth.

2. A signal-lantern comprising a top stepped ventilator and a protecting-ring connected thereto and having a downwardly-projecting peripheral flange, a bottom stepped ventilator, a bottom piece, and tie-rods connecting said top and bottom ventilators together and to said bottom piece, superposed illuminating appliances supported from some of said tie-rods, and a light-interrupting partition between said illuminating appliances constructed to afford free circulation of air from bottom to top of lantern, in combination with a lantern body or shell constructed of non-transparent and transparent sections separably connected together, said shell itself separable from the top and bottom ventilators and their tie-rods, for the purpose set forth.

3. In a signal-lantern, top and bottom sections, tie-rods connecting the same, illuminating devices supported from such tie-rods, a lantern body or shell composed of non-transparent and transparent sections separably assembled, and tie-rods screw-threaded at one end and hinged at the other end to the lower lantern-shell section, said screw-threaded ends of the rods having bearing in slotted ears $a^{23}$ secured to the upper lantern-shell section, and suitable nuts securing said rods to their said bearings, for the purpose set forth.

4. A signal-lantern comprising superposed groups of incandescent lamps, a resistance W' included in the lamp-circuits, electrically-operated switches in said circuits adapted to cut out the aforesaid resistance to supply current to one or the other group of lamps and to both groups alternately, for the purposes set forth.

5. In a signal-lantern top and bottom ventilators, a bottom piece containing a contact-block $a^{10}$ having separable or plug contacts for the circuit-leads, tie-rods connecting the said ventilators together and to the bottom piece, two groups of superposed incandescent lamps supported from some of said tie-rods, suitable electric connections, connected with the aforesaid separable contacts, a resistance W' in the lamp-circuits, an electromagnetic cut-out in said circuits adapted to cut out the resistance and supply current to one or the other group of lamps or to both groups alternately, said resistance and cut-out also supported from some of the tie-rods, and a light-intercepting partition between the two groups of lamps constructed to admit of free circulation of air from bottom to top of lantern, in combination with a lantern body or shell having light-transmitting zones in the plane of the aforesaid group of lamps, said body or shell separable from the top and bottom ventilators, for the purpose set forth.

6. A night signaling apparatus comprising three signal-lanterns each provided with two light-transmitting zones of different colors, normally-closed electric circuits including the lamps of said lanterns, a resistance in said circuits through which resistance current is diverted from the lamps, a transmitting-lever, circuit making and breaking appliances interposed in the supply-circuits and constructed to send current to one or the other group of lantern-lamps, said supply-circuits arranged to supply current to the same group of lamps in at least two of the lanterns, and automatic cut-out devices for cutting out the lamp-circuit resistances, for the purpose set forth.

7. A night signaling apparatus comprising three signal-lanterns, each provided with two light-transmitting zones of different colors, normally-closed electric circuits including the lamps of said lanterns, a resistance in said circuits through which resistance current is diverted from the lamps, a transmitting-lever, circuit making and breaking appliances interposed in the supply-circuits and constructed to send current to one or the other group of lantern-lamps, said supply-circuits arranged to supply current to the same group of lamps in at least two of the lanterns, and automatic cut-out devices for cutting out the lamp-circuit resistances and supply current to the lamps, in combination with an electrically-operated auxiliary switch in said lantern-circuits also controlled by the transmitting-lever and adapted to send currents intermittingly to one or the other group of lantern-lamps or to both groups alternately, for the purpose set forth.

8. A night signaling apparatus comprising three signal-lanterns each provided with two light-transmitting zones of different colors, normally-closed electric circuits including the lamps of said lanterns, a resistance in said circuits through which resistance current is diverted from the lamps, a transmitting-lever, circuit making and breaking appliances interposed in the supply-circuits and constructed to send current to one or the other group of lantern-lamps, said supply-circuits arranged to supply current to the same group of lamps in at least two of the lanterns, and automatic cut-out devices for cutting out the lamp-circuit resistances and supply current to the lamps, in combination with an electrically-operated auxiliary switch in said lantern-circuits also controlled by the transmitting-lever and adapted to send current intermittingly to one or the other group of lantern-lamps or to both groups alternately, and means for automatically determining the duration of the intermittent or alternate current impulses, for the purpose set forth.

9. In a night signaling apparatus comprising at least two lanterns, each having two light-transmitting zones of different colors and two groups of incandescent lamps, suitable lamp-circuits, a resistance through which current is diverted from the lamp-circuits, electrically-operated cut-outs for cutting out the said resistances to supply current to the lamps, and suitable supply-circuits, in combination with a transmitter, a signal-recording mechanism, an electrically-controlled switch for sending current intermittingly to one or the other group of lantern-lamps or to both groups alternately, a main supply-circuit and suitable main switches therein controlling the transmitter-circuits, said transmitter, recording mechanism, main and auxiliary switches and their electrical connections located in one and the same casing, substantially as and for the purpose set forth.

10. The transmitter-casing divided into upper and lower compartments by a removable partition, the upper compartment composed of two parts hinged together and supporting the transmitter and signal-recorder, said partition supporting the transmitter contact-cylinder, and the electrically-operated intermittent and alternate color-switch, the lower part of said casing containing the various main-circuit switches, in combination with separable electrical connections between said parts, for the purposes set forth.

11. In a signaling apparatus such as described, a main switch comprising two segmental contacts diametrically opposite each other, a fixed switch-spindle, a contact-brush loosely mounted thereon, a switch lever or handle likewise loose on said spindle and provided with a radial L-shaped arm having an opening, and a concave seat surrounding said opening, in its horizontal member; in combination with a crank loosely mounted on the switch-spindle and connected with the contact-brush, and a spring-controlled telescopic pin journaled to said crank, one of the members of said pin working within the other and in the opening in the aforesaid switch-lever radial arm, and the other tubular member of the switch seated in the seat formed around said opening, substantially as and for the purpose set forth.

12. In a signaling apparatus such as described, a record-ribbon-feed mechanism comprising a ribbon reel or drum, a guide for the ribbon having an opening therein exposing said ribbon to the record-producer, a ribbon-clamp composed of two connected jaws pivoted on one and the same pivot, one of said jaws having motion toward and from the other, and mechanism for opening and closing said jaws and imparting to them a vibrating motion, for the purpose set forth.

13. In a signaling apparatus such as described, a signal-recorder comprising a revoluble and vertically-movable wheel, provided near its periphery with signal-indices formed of downwardly-projecting needles; in combination with a record-ribbon-feeding mechanism adapted to feed the ribbon in the plane of said signal-indices, and a resilient support for the ribbon, as a brush, at the point where the record is produced, for the purpose set forth.

14. The combination with the ribbon reel or drum, the ribbon-guide $e'$, the two-part clamp E pivoted at $e^6$, the clamp-jaw $e^4$ having a longitudinally-elongated pivot-bearing and an enlargement from which projects a pin $e^{11}$ and the spring-controlled lever $e^9$; in combination with a vertically-movable spring-controlled bar provided with a forked projection $e^{21}$ whose arms move in the path of the aforesaid pin $e^{11}$, substantially as and for the purpose set forth.

15. The combination with the transmitter-casing provided with a lateral opening and the door $b^4$ for closing the same, and the lower jaw $e^4$ of the ribbon-clamp E provided with a perforated enlargement; of the bell-crank lever $e^{14}$ the short arm of which has a lateral pin $e^{11}$ extending through the perforation in the aforesaid jaw enlargement, and the push-rod $e^{13}$ connected with the longer arm of said bell-crank lever and extending to the outside of the transmitter-casing into the path of the aforesaid door, for the purpose set forth.

16. In a signaling apparatus such as described, a switch for the transmission of electric impulses for the production of intermittent or alternate color signals or signal-symbols, comprising an electromagnet, a revoluble armature controlled by said magnet, a vibratory switch, and electric contacts in the path of said switch; in combination with an escapement the wheel of which receives motion in one direction from the armature, a spring for moving said wheel in an opposite direction, and a spring connection between the escapement-wheel and the switch, the controlling-spring of the armature being brought under tension when said armature is moved from its position of rest, and the spring of said escapement and switch when moved to its position of rest, for the purpose set forth.

17. In a signaling apparatus such as described, a switch for the transmission of electric impulses for the production of intermittent or alternate color signals or signal-symbols, comprising an electromagnet, a revoluble armature controlled by said magnet, a vibratory switch, electric contacts in the path of said switch, an escapement the wheel of which receives motion in one direction from the armature, a spring for moving said wheel in an opposite direction, and a spring connection between the escapement-wheel and the switch, the controlling-spring of the armature being brought under tension when said armature is moved from its position of rest and the spring of said escapement and switch when moved to its position of rest; in combination with locking devices for locking the switch alternately to one or the other of its contacts and releasing devices controlled by the escapement-wheel for alternately releasing said locking devices, for the purpose set forth.

18. The combination with the electromagnet F, its pole-shoes $f f^\times$, the Z-shaped armature $f^2$ revoluble between said pole-shoes and provided with the stud 4, the armature-retracting spring $f^3$, the forked switch $f^4$ loose on armature-spindle and provided with the pin 25 and the contacts 1', 2', between which said switch is adapted to vibrate from one of said contacts to the other; of the escapement-wheel G provided with studs 5 and 6, its actuating-spring $g'$, the ellipsoidal strap $f^7$ connected pivotally with the aforesaid switch and with the wheel G by spring 3', and the switch-locking pawls $f^5$, $f^6$, substantially as and for the purpose set forth.

19. The combination with the switch-base 20 having feet 23, the electromagnet, its pole-shoes and armature, the contacts 1', 2', the switch $f^4$, the switch-operating mechanism substantially such as described supported from said base, and a bolt-plate $B^\times$ secured to upper pole-shoe $f$ of the electromagnet; of the transmitter-casing and its separable partition B' to the under side of which said plate $B^\times$ is secured, for the purpose set forth.

20. A contact-cylinder composed of three groups of toothed contact-rings, group 1 composed of rings U+WI, RI, WII and RII group 2 of rings $Z^2$ WiI, WiII, RiI and RiII, and group 3 of rings $Z^3$ WRI and WRII, a conductive carrier on which said groups are rigidly secured, a conductive bearing on which said carrier is revoluble, a circuit-closer contained within said bearing and composed of two parts insulated from each other but electrically connected with the aforesaid bearing, said parts of the circuit-closer connected with a source of electricity; in combination with a movable contact adapted to electrically connect the two parts of the circuit-closer and means for taking current from the contact-rings, substantially as and for the purpose set forth.

21. The contact-cylinder C, a cylindrical bearing upon which said cylinder is revolubly seated, said bearing-cylinder provided with an internal peripheral flange, the two-part contact-sleeve $q$ secured to said flange, and pillar-terminals connected with parts of said sleeve and projecting from the lower end of the bearing; in combination with the signal-transmitting lever $c^5$, its spindle $c^4$ carrying at its lower end resilient contacts $p$ adapted to contact with the parts of said sleeve $q$, and a pin revoluble with the lever-spindle and adapted to engage the contact-cylinder, substantially as and for the purpose set forth.

In testimony whereof I affix my signature in presence of two witnesses.

LEOPOLD SELLNER.

Witnesses:
HARRY BELMONT,
VICTOR KARMIN.